US011955136B2

(12) United States Patent
Paine

(10) Patent No.: US 11,955,136 B2
(45) Date of Patent: Apr. 9, 2024

(54) SYSTEMS AND METHODS FOR GUNSHOT DETECTION

(71) Applicant: Garth Paine, Tempe, AZ (US)

(72) Inventor: Garth Paine, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 278 days.

(21) Appl. No.: 17/215,969

(22) Filed: Mar. 29, 2021

(65) Prior Publication Data

US 2021/0304784 A1 Sep. 30, 2021

Related U.S. Application Data

(60) Provisional application No. 63/000,736, filed on Mar. 27, 2020.

(51) Int. Cl.
*G10L 25/18* (2013.01)
*G10L 25/51* (2013.01)

(52) U.S. Cl.
CPC .............. *G10L 25/18* (2013.01); *G10L 25/51* (2013.01)

(58) Field of Classification Search
None
See application file for complete search history.

(56) References Cited

U.S. PATENT DOCUMENTS

| | | | | |
|---|---|---|---|---|
| 9,218,728 B2 * | 12/2015 | Bickel | G08B 13/1672 |
| 11,151,852 B2 * | 10/2021 | Anderson | G08B 21/182 |
| 2010/0004926 A1 * | 1/2010 | Neoran | G10L 25/48 704/201 |
| 2020/0257722 A1 * | 8/2020 | Zhang | G06F 16/683 |
| 2021/0020023 A1 * | 1/2021 | Pirkle | H04R 3/005 |

OTHER PUBLICATIONS

Caetano et al. "Automatic segmentation of the temporal evolution of isolated acoustic musical instrument sounds using spectro-temporal cues", DAFx-10, Sep. 2010, pp. 11-21 (Year: 2010).*
Apopei "Detection dangerous events in environmental sounds—a preliminary evaluation", IEEE, 2015 (Year: 2015).*
Kyle Hoefer, Gunshot Detection and Localization for Anti-Poaching Initiatives, Arizona State University, Apr. 2019, 58 pages.
Arar, Aug. 28, 2017, An Introduction to the Fast Fourier Transform. Retrieved Mar. 15, 2019 from https://www.allaboutcircuits.com/technical-articles/an-introduction-to-the-fast-fourier-transform/.
Arduino (n.d.). Retrieved on Jan. 14, 2019 from https://www.arduino.cc/.
Bandi, et al., A novel approach for the detection of gunshot events using sound source localization techniques, 2012 IEEE 55th International Midwest Symposium on Circuits and Systems, (MWSCAS), Boise, ID, 2012, pp. 494-497.
Bullock (n.d.), LibXtract. Retrieved Mar. 17, 2019 from https://code.soundsoftware.ac.uk/projects/libxtract.
(Continued)

*Primary Examiner* — Pierre Louis Desir
*Assistant Examiner* — Nicole A K Schmieder
(74) *Attorney, Agent, or Firm* — POLSINELLI PC

(57) ABSTRACT

Various embodiments of a system and associated method for detecting and localizing gunshots are disclosed herein.

15 Claims, 26 Drawing Sheets
(20 of 26 Drawing Sheet(s) Filed in Color)

(56) References Cited

OTHER PUBLICATIONS

Bullock, 2008, Implementing audio feature extraction in live electronic music, Birmingham City University. Retrieved Mar. 20, 2019 from https://www.academia.edu/4493811/implementing_audit_feature_extraction_in_live_electronic_music.
Chacon-Rodriguez, et al., Evaluation of Gunshot Detection Algorithms, IEEE Transactions on Circuits and Systems I: Regular Papers, vol. 58, No. 2, pp. 363-373, Feb. 2011.
Chioye (Dec. 6, 2013), Choose The Right FFT Window Function When Evaluation Precision ADCs. Retrieved Apr. 5, 2019 from https://www.electronicdesign.com/analog/choose-right-fft-window-function-when-evaluation-precision-adcs.
Clavel, et al., Events Detection for an Audio-Based Surveillance System, 2005 IEEE International Conference on Multimedia and Expo, Amsterdam, 2005, pp. 1306-1309.
Foundation (n.d.), Raspberry Pi. Retrieved on Apr. 10, 2019 from https://www.raspberrypi.org/.
IZotope Inc. (n.d.), IZotope RX 7. Retrieved on Jan. 10, 2019 from https://www.izotope.com/en.products/repair-and-edit/rx.html.
K, Jan. 1, 1970, Rural hacker. Retrieved Feb. 1, 2018 from http://ruralhacker.blogspot.pt/2013/01/arduino-micloc-or-acoustic-location.html.
Maher, Acoustical characterization of gunshots, Signal Processing Applications for Public Security and Forensics, 2007, SAFE '07, IEEE Workshop, pp. 1-5, Apr. 2007.
Maher, Modeling and signal processing of acoustic gunshot recordings, Proc. IEEE Signal Processing Society, 12th DSP Workshop, 2006.
MATLAB (n.d.). Retrieved on Jan. 13, 2019 from https://www.mathworks.com/products/matlab.html.
MATLAB, GCC-PHAT Documentation. Retrieved Jan. 7, 2019 from https://www.mathworks.com/help/phased/ref/gccphat.html?s_tid=gn_loc_drop.
Paine (2017), Acoustic Ecology 2.0, Contemporary Music Review, Nov. 15, 2017.
Paine, Listening to nature: How sound can help us understand environmental change: The Conversation, Dec. 21, 2018. https://theconversation.com/listening-to-nature-how-sound-can-help-us-understand-environmenal-change-105794.
PJRC (n.d.), Teensy. Retrieved on Apr. 10, 2019 from https://www.prjc.com/teensy/.
PROCAT—Proyecto de Conservation de Aguas y Tierras (n.d.). Retrieved on Apr. 7, 2019 from http://procat-conservation.org/.
Rural hacker (n.d.). Retrieved Feb. 1, 2018 from http://ruralhacker.blogspot.com/p/micloc.html.
Sadler, et al., Optimal and robust shockwave detection and estimation, Proc. IEEE ICASSP, 1997, vol. 3, pp. 1889-1892.
Sam (Nov. 13, 2017), What is Teensy?—Tutorial. Retrieved Mar. 20, 2019 from https://core-electronics.com.au/tutorials/what-is-teensy.html.
Sampling (signal processing), Feb. 25, 2019. Retrieved Mar. 15, 2019 from http://en.wikipedia.org/wiki/Sampling_(signal_processing).
Sengpiel (n.d.), The Human Perception of Loudness. Retrieved Mar. 19, 2019 from http://www.sengpielaudio.com/calculator-loudess.htm.
Shaw (n.d.) Multilateration (MLAT). Retrieved on Apr. 5, 2019 from http://www.multilateration.com/surveillance/multilateration.html.
ShotSpotter (n.d.). Retrieved on Jan. 7, 2019 from https://www.shotspotter.com/.
Shovic (n.d.) Solar Power Management >> Raspberry Pi Geek. Retrieved Feb. 10, 2018 from http://www.raspberry-pi-geek.com/Archive/2015/10/Managing-solar-power-systems-with-SunAir-boards.
Sonic Visualiser (n.d.). Retrieved Jan. 16, 2018 from https://www.sonicvisualiser.org/.
Spectral centroid (May 27, 2018). Retrieved Mar. 13, 2019 from https://en.wikipedia.org/wiki/Spectral_centroid.
Sue (n.d.) Vacation Planning. Retrieved Feb. 10, 2018 from https://costa-rica-guide.com/travel/weather/sunshine-temperature-map/.
Sweetwater, Effects of Temperature and Humidity on Live Sound. Retrieved Mar. 17, 2019 from https://www.sweetwater.com/insync/effects-of-temperature-humidity-live-sound/.
Teensy—Audit System Design Tool (n.d.). Retrieved Apr. 1, 2019 from https://www.prjc.com/teensy/gui/?info=AudioAnalyzeFET1024.
Teensy 3.1 XBee Adapter (n.d.). Retrieved Feb. 10, 2018 from https://www.amazon.com/SparkFun-LYSB011QI2IMW-ELECTRNCS-Teensy-XBee-Adapter/dp/B011QI2IMW.
The Acoustic Ecology Lab @ ASU (n.d.). Retrieved on Apr. 12, 2019 from https://acousticecologylab.org/.
The Phoenix Zoo (n.d.). Retrieved on Apr. 2, 2019 from https://www.phoenixzoo.org/.
Thread: Achieving Lower Power Consumption with Teens 3.1 and the latest Teensyduino Version (n.d.). Retrieved Feb. 10, 2018 from https://forum.pjrc.com/threads/28122-Achieving-Low-Power-Consumption-with-Teens-3-1-and-the-latest-Teensyduino-Version.
What is LoRa®? (n.d.). Retrieved from https://www.semtech.com/lora/what-is-lora.
Windows and Spectral Leakage, Jan. 3, 2019. Retrieved Mar. 17, 2019 from https://community.plm.automation.siemens.com/t5/Testing-Knowledge-Base/Windows-and-Spectral-Leakage/ta-p/432760.
XBee (Jan. 31, 2017). Retrieved Feb. 10, 2017 from https://wn.wikipeda.org/wiki/XBee.
XBee Buying Guide (n.d.). Retrieved Feb. 10, 2018 from https://www.sparkfun.com/pages/xbee_guide.
Zoom H2n Handy Recorder, 2019. Retrieved on Mar. 22, 2019 from https://www.zoom-na.com/products/field-video-recording/field-recording/zoom-h2n-hand-recorder.

* cited by examiner

*Microphone 1* *(M1D5) (20m from shot)*

*Microphone 2* *(M4D5) (250m from shot)*

*Microphone 3* *(M2D5) (610m from shot)*

*Microphone 4* *(M4D5) (960m from shot)*

SYSTEMS AND METHODS FOR GUNSHOT DETECTION

CROSS-REFERENCE TO RELATED APPLICATIONS

This is a non-provisional application that claims benefit to U.S. provisional application Ser. No. 63/000,736 filed on 27 Mar. 2020, which is herein incorporated by reference in its entirety.

FIELD

The present disclosure generally relates to anti-poaching technology; and in particular, to systems and methods for low-cost automated gunshot detection and localization for anti-poaching initiatives.

BACKGROUND

Las Alturas Del Bosque Verde is a privately owned, ten-thousand hectare (24,171 acres) animal sanctuary in the Puntarenas region of Southern Costa Rica, bordering the country of Panama. Although its abundant levels of relatively rare species, such as white-lipped peccary and jaguar are positives, the region has also been subject to poaching. As a private organization, Las Alturas employs locals as security guards to protect against intruders attempting to poach wildlife and interfere with coffee farming. However, due to the sheer size of this sanctuary and the fact that many public off-roads intersect the private land, it is nearly impossible to catch these poachers in the act. There are simply too many roads and insufficient personnel to safely guard all the highly-poached areas. An added level of concern is that the local village is small enough so that poachers learn the movements and schedules of the guards on duty. This allows the intruders to not only avoid them while on the preserve, but also to target the guards and their families as payback for enforcement. It is not uncommon to hear from workers of run-ins with these intruders that contain instances of being shot at and harassed, on and off the private land Because of this concern, efforts are being made to autonomously monitor the region for species and hunters through motion-only based camera traps installed on the base of trees. While somewhat helpful, various issues have arisen—cameras must be fitted with large data SD cards, and the pictures written to these cards can only be viewed on a computer when the camera has been physically accessed and cards collected. The camera's line of sight is extremely limited resulting in over one-hundred cameras needing to be placed and serviced. It can only capture movement in a short period of time meaning a picture of poachers passing by from three weeks ago does not give sufficient information as to where the poaching occurred. Lastly, these camera units are not cheap and poachers are able to spot and destroy them due to their low-lying placement on the trees, even when encased in a steel housing.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
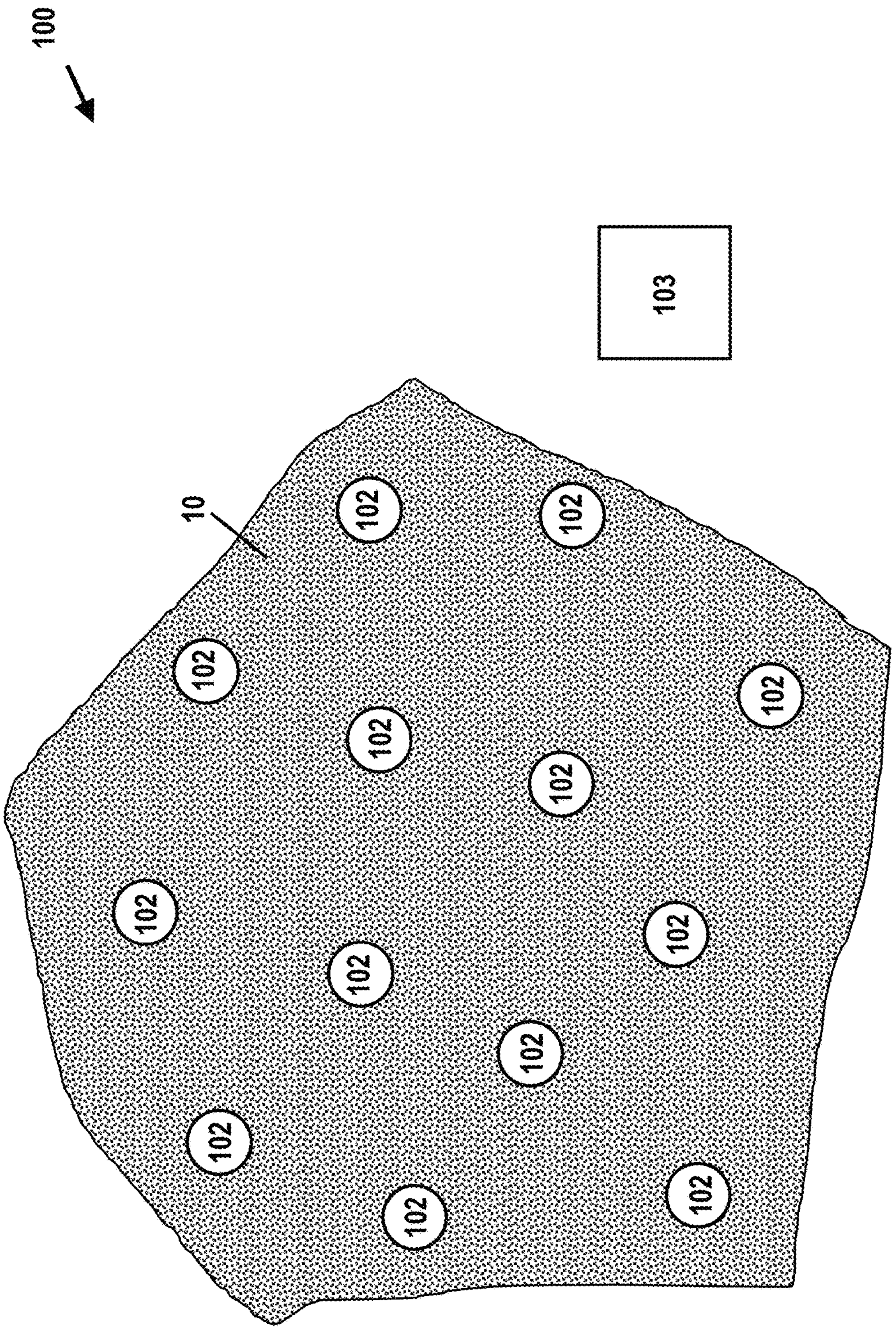
FIG. 1 is an illustration showing a gunshot detection system including an external computing system and a plurality of audio sensing devices placed throughout an area of land.

Various embodiments of a system and associated method for gunshot detection and localization using spectral analysis are disclosed herein. In some embodiments, the gunshot detection and localization system includes one or more microphones for detection of gunshots in communication with a plurality of hardware components for processing of audio signals obtained from the microphones. In some embodiments, the system is operable for distinguishing gunshots from natural sounds, such as wilderness noise, detected by one or more microphones using a dynamic vector analysis methodology to determine whether a combination of features of the audio data are indicative of a gunshot, rather than spectral masks. In particular, the system analyzes short bursts of incoming audio data using a comparative analysis of differentials between spectral centroids and amplitudes of audio samples. The system then transmits identifying information to an external computing system. Referring to the drawings, embodiments of the system for detecting and localizing gunshots are illustrated and generally indicated as 100 in FIGS. 1-23.

System Overview

Figure 2:
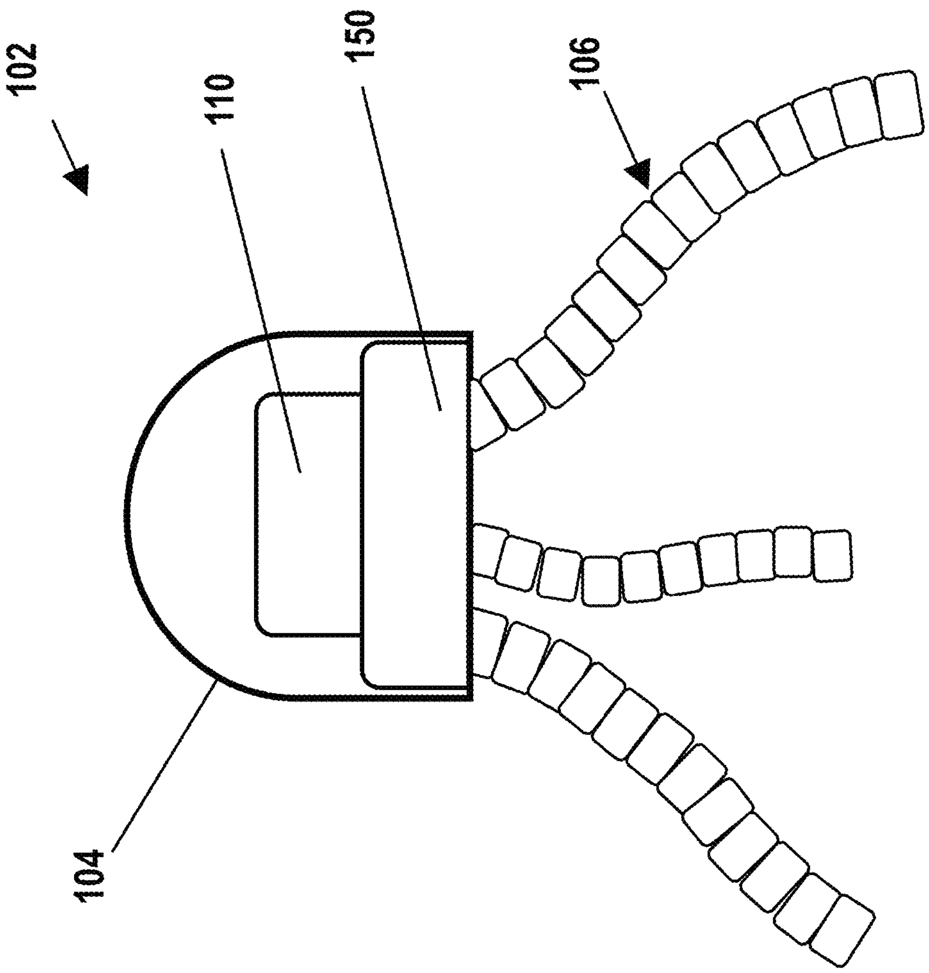
FIG. 2 is an illustration showing an embodiment of an audio sensing device of the gunshot detection system of FIG. 1.
Figure 3:
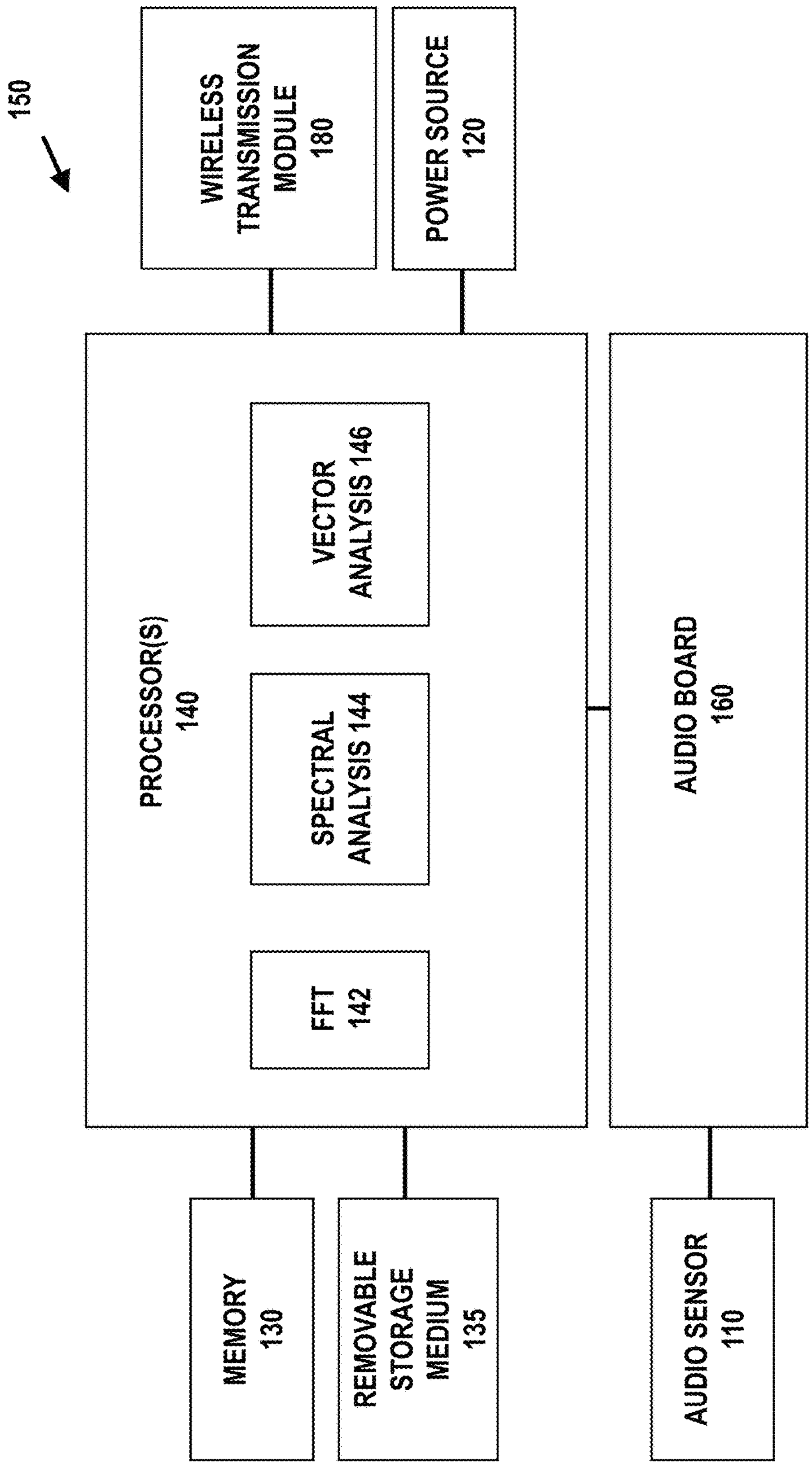
FIG. 3 is a diagram showing a plurality of hardware components of the audio sensing device of FIG. 2.

FIGS. 1-3 illustrate a gunshot detection system 100 including at least one audio sensing device 102 in communication with an external computing system 103. FIG. 1 in particular illustrates a plurality of audio sensing devices 102 positioned throughout an area of land 10 and in communication with external computing device 103. In some embodiments, as shown in FIG. 2, each audio sensing device 102 includes an audio sensor 110 disposed within a housing 104 and positioned on a tripod 106 or another suitable mounting system for secure and preferably inconspicuous placement of the audio sensing device 102. In some embodiments, the housing 104 includes weather-proofing and/or weather-protectant features such as waterproofing or humidity-reducing measures; however, it should be noted that necessary audio frequencies must still be able to pass through the housing 104 to the audio sensor 110.

Figure 21:
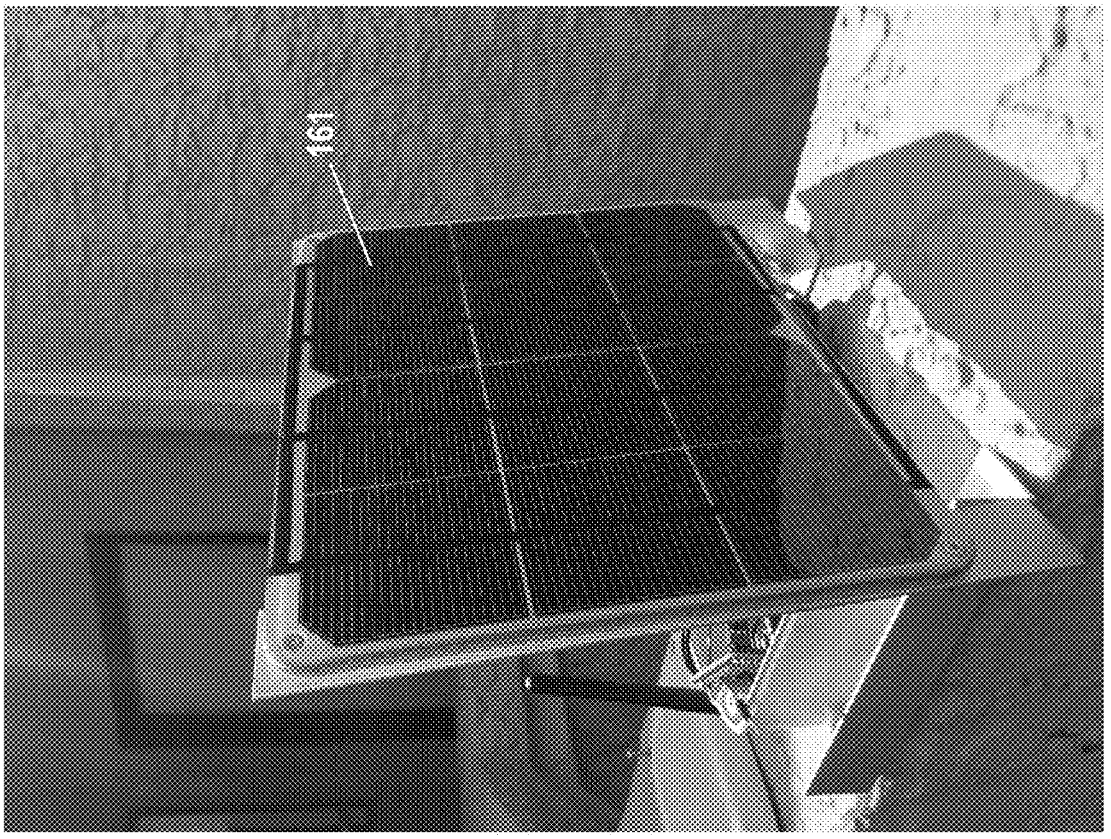
FIG. 21 is a photograph showing a photovoltaic cell for use with the system of FIG. 1.

Referring to FIG. 3, each audio sensing device 102 further includes hardware components 150 including a processor 140 configured for processing audio data when a sound is captured by the audio sensor 110 and identifying whether a gunshot has occurred. The processor 140 further communicates with a memory 130 that stores instructions and in some embodiments stores captured audio data. The processor 140 further communicates with a wireless transmission module 180 for communicating identifying data to the external computing system 103 when a gunshot is detected by the audio sensor 110. In one aspect, the wireless transmission module 180 can use WiFi, IoT or LTE. IoT implementation of wireless transmission module 180 can provide improved long-range functioning in remote environments. In some embodiments, the processor 140 is operable for onboard processing of audio to detect gunshots. In one main embodiment, the processor 140 enables each audio sensing device 102 to accept audio input when triggered by a gunshot, verify that a gunshot has occurred, and then transmit identifying data to the external computing system 103. The audio sensing device 102 also stores the audio data from each detected gunshot on a suitable removable storage medium 135 such as a micro-SD card for further analysis of items such as gun caliber, time of gunshot, etc., to properly document the gunshot occurrence. Each audio sensing device 102 further includes a power source 120, for example, a photovoltaic cell 161 (FIG. 21).

Figure 4:
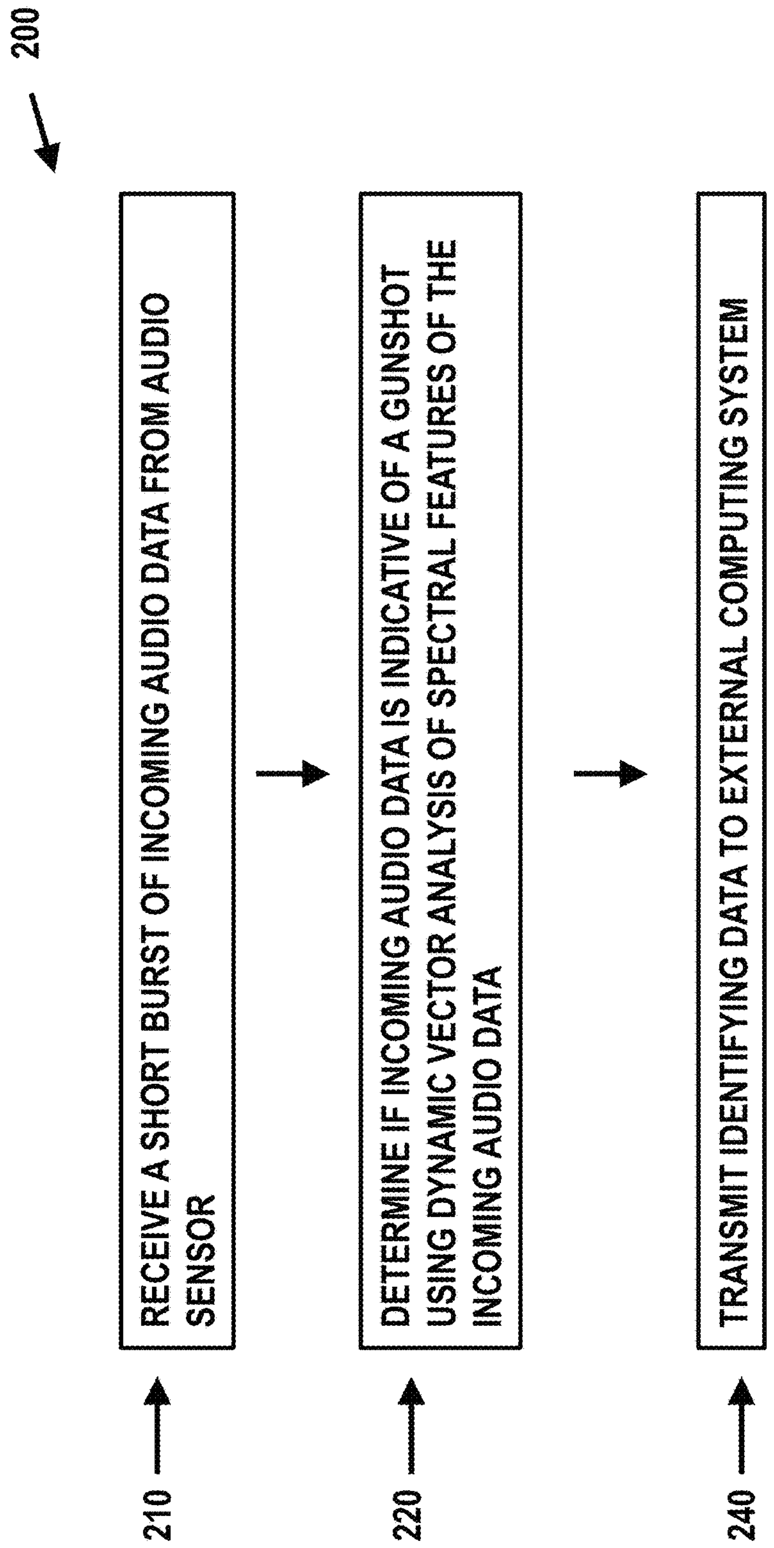
FIG. 4 is a flowchart showing an overall method for detection of gunshots.

Referring to FIGS. 3 and 4, in one method 200 of determining whether a gunshot has occurred using the gunshot detection system 100, at block 210 (FIG. 4), an audio sound is received by an audio sensor 110 of an audio sensing device 102. In one embodiment, there is a constant buffer of audio being stored so that when a gunshot event is triggered by divergent vectors of spectral centroid and amplitude, the system 100 draws on the buffer, thereby having a full audio recording to use and store. At block 220 (FIG. 4), a processor 140 of the audio sensing device 102 determines if the incoming audio sound is indicative of a gunshot by dynamic vector analysis of spectral features of the incoming audio sound, particularly by FFT module 142, spectral analysis module 144 and vector analysis module 146 of FIG. 3. Steps performed at block 220 are elaborated on herein and further shown in FIGS. 5 and 6. At block 240 of FIG. 4, if the audio sensing device 102 verifies that the audio sound is indicative of a gunshot, the audio sensing device 102 transmits identifying data of the audio sound to the external computing system 103 to inform authorities. In some embodiments, the identifying data includes values related to amplitude and spectral centroid of the audio sound, and can also include a device identifier to let the external computing system 102 know which audio sensing device 102 has detected the sound.

Figure 5:
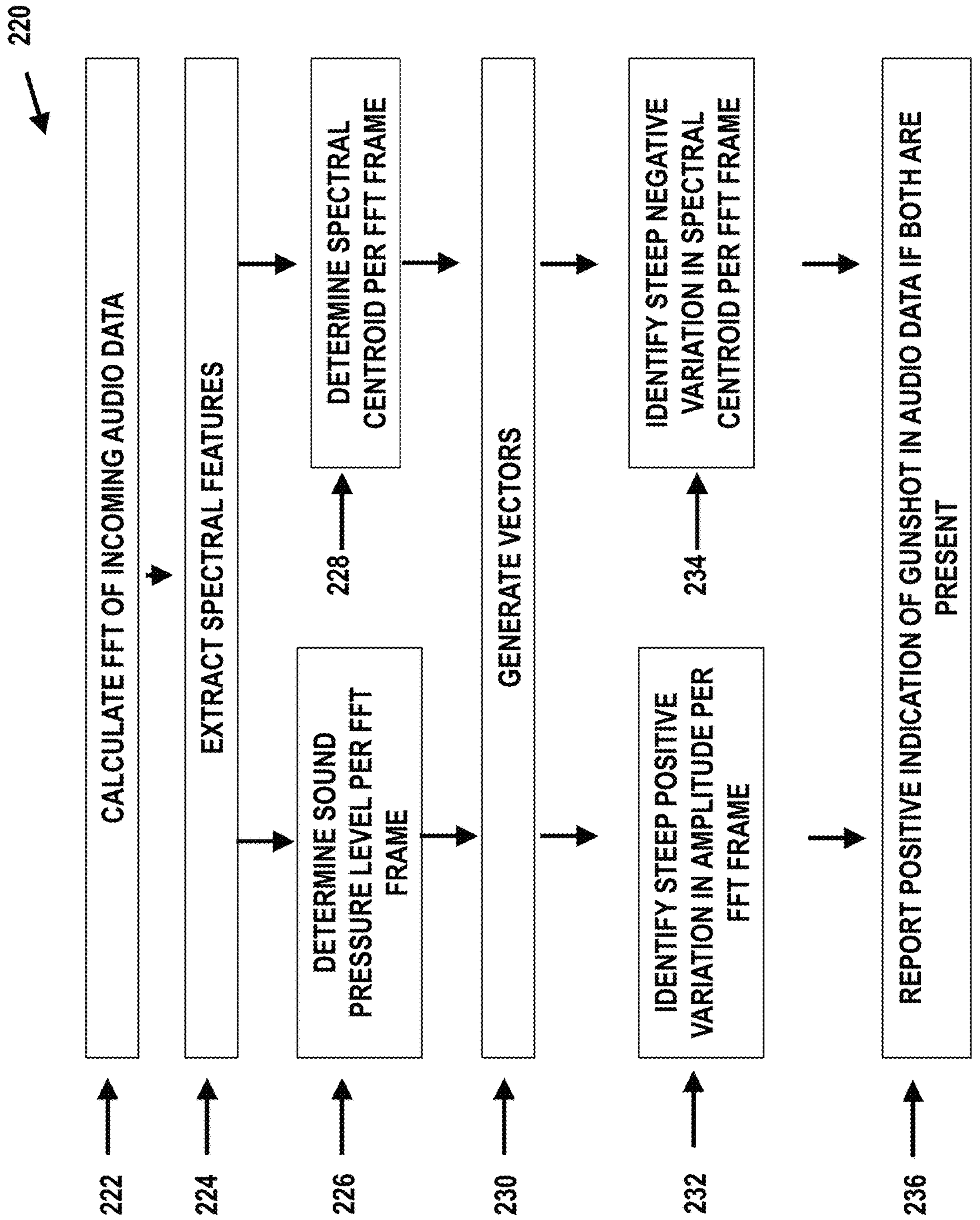
FIG. 5 is a flowchart further showing a method for determining if incoming audio data is indicative of a gunshot.
Figure 6:
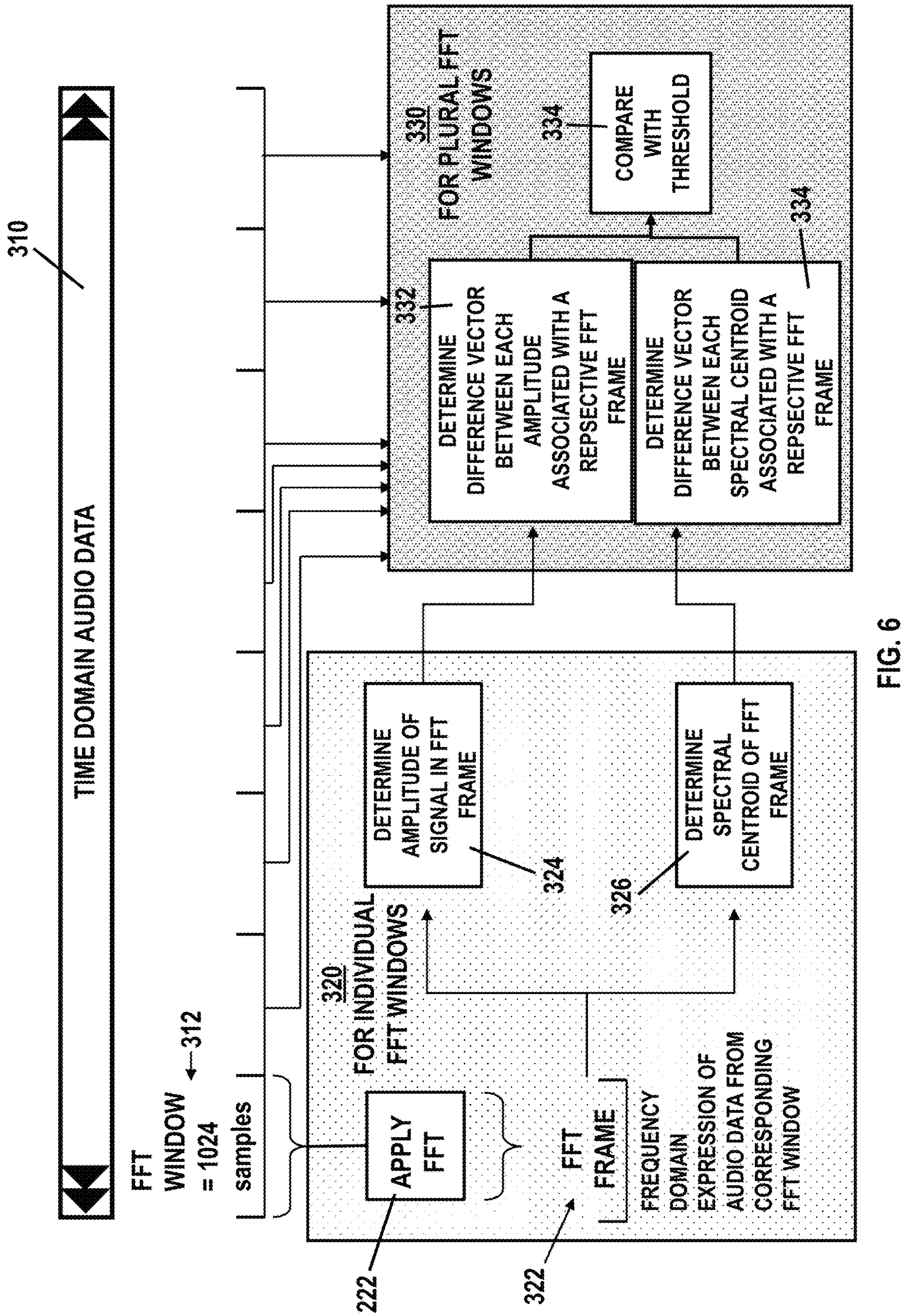
FIG. 6 is a diagram showing a process for spectral and vector analysis of incoming audio data for detection and localization of gunshots.
Figure 7:
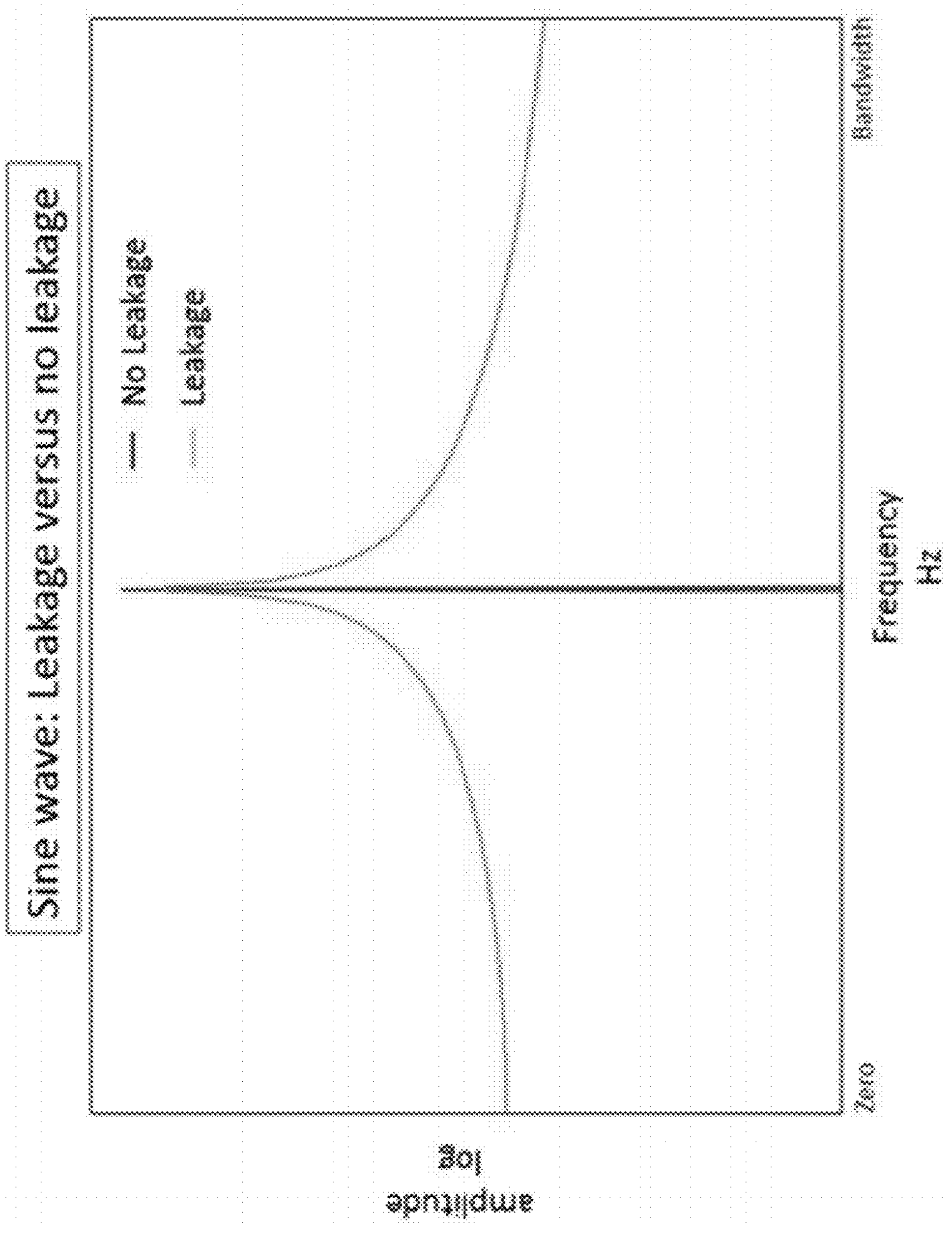
FIG. 7 is a graphical representation of a sample frequency spectrum of a sine wave with windowing (red) and without windowing (green)

Referring to FIGS. 5 and 6, the audio sensor 110 receives the audio sound and converts the audio sound to time domain audio data 310 (FIG. 6). Subsequently, at block 222 of FIG. 5, upon receiving the identifying audio data including incoming time domain audio data 310, the time domain audio data 310 is divided into a plurality of FFT windows 312. In some embodiments, an FFT window size of 1024 audio samples was selected for reasons further elaborated on herein. For each individual FFT window 312, as shown in block 320 of FIG. 6, the processor 140 is operable for performing fast Fourier transforms (FFTs) on each individual FFT window 312 of the time domain audio data 310 collected by audio sensor 110 according to block 222, forming an FFT frame 322 which is a frequency-domain expression of the time-domain audio data 310 from the corresponding FFT window 312. At block 224, spectral features are extracted from each FFT frame 322 of the plurality of FFT frames including an amplitude 324 of the signal in the FFT frame 322 and a spectral centroid value 326 of the signal in the FFT frame 322. For each FFT frame 322, including a first FFT frame 322 and a second FFT frame 322, a first amplitude 324 is determined for the first FFT frame 322, and a second amplitude 324 is determined for the second FFT frame 322. Similarly, a first spectral centroid 326 is determined for the first FFT frame 322 and a second spectral centroid 326 is determined for the second FFT frame 322.

As shown in block 330 of FIG. 6, for plural FFT windows 312 and according to step 230 of FIG. 5, vector analysis is performed on: a) each amplitude with respect to at least another amplitude of at least another FFT frame 322, and b) each spectral centroid with respect to at least another spectral centroid of at least another FFT frame 322 to identify a sharp increase in perceived loudness as well as a sharp decrease in the spectral centroid, both characteristics together being indicative of a gunshot. In some embodiments, thresholds for steepness of both loudness and spectral centroid are determined using historical averaging. It should be noted that in some embodiments, vector analysis is performed simultaneously for amplitude and spectral centroid. In particular, block 332 of FIG. 6 shows the step of determining an amplitude difference vector between each amplitude 324 associated with a respective FFT frame 322 for each of the plurality of FFT windows 312. Given the first amplitude 324 of the first FFT frame 322, and the second amplitude 324 of the second FFT frame 322, the amplitude difference vector is generated by determining a vector between the first amplitude 322 and the second amplitude 322.

Block 334 of FIG. 6 shows the step of determining a spectral centroid difference vector between each spectral centroid 326 associated with a respective FFT frame 322 for each of the plurality of FFT windows 312. Similarly, given the first spectral centroid 326 of the first FFT frame 322, and the second spectral centroid 326 of the second FFT frame 322, the spectral centroid difference vector is generated by determining a vector between the first spectral centroid 326 and the second spectral centroid 326. At block 334, the amplitude difference vector and spectral centroid difference vector are compared with respective threshold values to determine if the amplitude difference vectors and spectral centroid difference vectors match those of a typical gunshot. At block 232 of FIG. 5, the processor 140 determines whether a steep positive variation in amplitude is indicative of a gunshot is present. At block 234, the processor 140 determines whether a steep negative variation in spectral centroid indicative of a gunshot is present. If both vectors follow this pattern, then at block 236, the processor 140 reports a positive indication of a gunshot. Vector analysis on the rates of change of amplitude and spectral centroid for each FFT frame 322 improves upon previous loudness or frequency thresholding technologies by examining the rate of change of the amplitude and spectral centroid as a vector. This allows the gunshot detection system 100 to characterize the audio by how sharp the sudden peak in loudness and sudden drop in frequency center of mass are in the time domain, which are defining characteristics of a gunshot that distinguishes a gunshot from other loud and/or deep sounds found in nature.

A successful gunshot detection system 100 allows security detail to gather information of poaching remotely and safely in real-time, and be alerted to the location of gunshots all without time consuming cameras or listening device servicing after the fact. The gunshot detection system 100 will also store a recording of the gunshot. The gunshot detection system 100 is also low cost and self-sustaining such that the price point for securing such monitoring services is greatly reduced from current camera based approaches.

Motivation

As discussed, the gunshot detection system 100 was created to combat illegal poaching in sanctuary terrain by detecting and localizing gunshots through audio analysis in order to apprehend violators. Thus, various design considerations include:

Upkeep: It is difficult to travel across the sanctuary's terrain. It was clear from the beginning of this project that any system must be self-sustaining for an extended period of time without service. The need to consistently service any surveillance unit in this area would make it less useful than not having one at all, as time and effort would be taken away from patrolling and be exhausted on upkeep. A potential solution to this problem was the use of solar to charge and maintain battery power, as discussed in more detail below. The data can also be retrieved remotely using IoT (Internet of Things).

Location: The placement of existing cameras led to them being destroyed since their placement required line of sight to the object they are trying to capture. This issue can be mitigated through the application of audio, as the audio sensor 110 does not need to be directly in view of whatever it is capturing, so long as its surroundings do not obstruct the sound from reaching it. Because of this, it was decided that the gunshot detection system 100 must be installed out of sight, but not obstructed, high along the treeline canopy of the forest. This location also allows for easier installation of a solar unit or photovoltaic cell to be used as or in communication with power source 120 as sun rarely passes through to the lower dense rainforest canopy.

Weather: Although the vast majority of poaching is throughout the six-month dry season, there are still instances where rain and high humidity levels could affect performance and accuracy of the gunshot detection system 100. Proper protection of the audio sensor 110, and associated hardware components 150 is required to keep moisture out but still allow necessary audio frequencies to pass and maintain moisture occurring due to temperature gradient change.

Scale: It was clear from the beginning that due to the size of this plot of land, it would be nearly impossible to cover all of it. The previous camera surveillance has proven high traffic areas for poaching due to the public off roads, and there are a few sections of specialized plots (reaching an extent of approximately 20-25 kilometers), which poachers tend to gravitate to.

Noise: The Costa Rican rainforest is home to an extensive range of creatures, some being extremely loud. Because this forest is not a quiet place, it was realized that sonic occurrences extremely close to the audio sensor 110, (howler monkeys, rain, crickets, rushing rivers, wind, etc.) could compromise and overpower any gunshot sound which occurred many kilometers away. Because of this, extra consideration has been made in the detection methodology 200 to distinguish background sound from sonic events of interest.

The Acoustics of Ballistics

The root of the present disclosure lies in understanding the sonic makeup of a gunshot. As such, it's important to first learn what characterizes a gunshot and how the gunshot travels across the many miles of a specific landscape. For example, firearms present three sonic events upon being discharged. These include the mechanical action, muzzle blast, and bullet shockwave. The mechanical action references the cocking mechanism on various semi-automatic rifles. In the case of this particular industrial application, previous evidence has proven poachers use bolt-action rifles as they are cheaper to purchase and provide more accuracy for hunting game. Bolt-action rifles fire a single gunshot and require manual cocking and reloading, therefore the semi-automatic mechanical action event has been ruled out. The muzzle blast occurs as the explosion of gunpowder propels the bullet out of the chamber. This event lasts around three to five milliseconds and is always louder when facing the barrel of the gun, although the energy wave is dispersed spherically at the speed of sound. Bullet shockwaves are created when the bullet reaches or surpasses the speed of sound. These shockwaves typically last two-hundred microseconds and propagate outwards from the bullet's path at its highest speed, becoming increasingly parallel to the bullet as it begins to slow. Although amplitude variation will occur depending on the direction of the shot, shockwaves will always reach a specific location prior to the muzzle blast if the bullet surpasses the speed of sound.

It is well known from confiscation of weapons from the poachers that the caliber of choice when hunting small game such as the peccary is the .22 long rifle. While hunting larger game such as the jaguar, a larger caliber ranging from 9 mm to the more easily accessible .223 or .308 has been found. However, the tradeoff with these larger, faster, rifle calibers is that it can maim the animal unintentionally depending on the bullet's path, destroying the coat or pieces of the animal which are important to the poachers. There is a specific set of .22 caliber ammunition called "sub-sonic" that operate below the speed of sound (approximately 1,125 feet per second), these are much quieter as they avoid the supersonic bullet crack. This round would significantly decrease the sound made by the poachers, but the low bullet travel speed paired with smaller round would not necessarily guarantee a kill on even small game due to its smaller energy transfer upon impact. Because of this, it was ruled out of being a concern.

Upon first describing a gunshot, one may say that it's loud and "boomy" at a significantly close distance. Further away it might be quieter, but one may still say they feel that boom in their chest, and this is what makes humans good at distinguishing a gunshot from any other loud sound. It was made clear through ballistics research that the key to creating a footprint of a gunshot is in its "rise time." That is the 200-microsecond window following the muzzle blast where the bullet breaks the speed of sound. This 'rise time' is in the amplitude/sound pressure level time domain. Such a quick rise and fall of energy emitted by this event is something which never occurs in nature, and is a key variable which distinguishes a gunshot from all other sound sources in the rainforest. Secondly the 'rise time' is reversed in a spectral centroid determinable in the frequency domain as low frequency energy from the gunshot at high sound pressure level forms a rapid negative vector of change in the spectral centroid.

Spectral Detection Parameters

Frequency Analysis of a Gunshot

As stated above, the root of the gunshot detection system 100 relies upon the sonic makeup of a gunshot. This analysis relies on several key DSP feature extraction techniques. Before delving into these extractions, it is important to look at the base algorithm, the Fast Fourier Transform, or "FFT" for short.

FFT: The Fast Fourier transform is a class of algorithm based around the computational optimization of the discrete Fourier transform (DFT), which is a group of equations allowing us to transform any signal which resides in the time domain (on this occasion gunshot recordings), to the frequency domain. There are a few key parameters that must be taken into consideration when performing this function. These include sampling rate, Nyquist frequency, window size, window overlap, window enveloped, FFT size, and bin size.

Sampling Rate: The sampling rate defines the average number of audio samples per second, this is specifically referenced in Hertz (Hz). The larger number of samples per second, the larger range of frequencies captured. As an example, telephone communication is limited to 8,000 Hz to preserve data size. Most CD quality audio has a sampling rate of 44.1 kHz, while DVD and Blu-ray audio can have rates of 96 kHz, or even up to 196 kHz.

Nyquist Frequency: The reason for these very specific sampling rates is in part due to the Nyquist theorem. This theorem states that in order to properly convert audio in an analog-to-digital conversion (ADC), and then reproduce the same signal using digital-to-analog converter (DAC), the sampling rate must be two times the highest frequency desired. If this value is not met, it can introduce aliasing and therefore unwanted distortion into the signal. The average range of human hearing spans from 20 Hz to 20,000 Hz, meaning the lowest sampling rate required to produce all frequencies humans can hear is 40 kHz. Any sampling rates past this value contain ultrasonic frequencies which cannot be heard by humans. In order to gather the largest possible amount of insight on the frequencies exhibited by the gunshot in initial testing, a sampling rate of 96 kHz was chosen, giving a frequency range up to 48 kHz, well into the ultrasonic range.

Windowing: When splitting a signal with non-periodic data from the time domain to the frequency domain, unwanted instances of spectral leakage can occur. This leakage can cause the signal to be redistributed over the entire frequency range, muddying the analysis of the amplitude of the desired range. This loss in amplitude due to spectral leakage can be viewed in FIG. 7. By applying a windowing function, this forces a smoothing of the data at the start and end of the progression, allowing for a more accurate analysis of amplitude. There are various windowing types which can be applied. In order for windowing to be applied appropriately, the window length must match the FFT size. For the purposes of the present system, the Hann window type was chosen, with a length of 1024 samples.

FFT & Bin Size: Before the FFT can be computed, it must collect a certain number of samples to be analyzed—this is known as the FFT size, or length. Common values of FFT length range from 1024, 2048, 8192, and even 16,384. The bin size references the number of bins, or the collections of frequencies that the FFT will be split into. The bin size varies as a function of the sampling rate and respective Nyquist frequency, and FFT size, and can be calculated as follows:

$$\frac{\text{Nyquist Frequency}}{FFT \text{ Frame Size}} = \text{Bin Size}$$

The longer the FFT length the higher the resolution of the frequency analysis, but the longer time it will take to compute. A larger FFT window also produces decreasing temporal resolution. As such, when analyzing a short sound, a shorter FFT length will give better temporal resolution, but the bin size (frequency resolution) will be larger and less accurate. If a longer FFT length is used then a smaller (more accurate) bin size is produced, but the event analysis could be skewed due to unwanted sonic events which occur in that time window, after the primary sound event. This tradeoff is a great concern for this project, as it was made clear from the previous acoustics research that gunshots are extremely quick sonic events happening in under a fifth of a second. However, as the principle initial energy in the gunshot resides at low frequencies, a high frequency resolution (small frequency bins) is required at low frequencies. A large FFT window size is required in order to produce this resolution, which works against the temporal resolution. Because there is no perfect solution to this problem, an FFT length and bin size must be computed which favors low computational power, but enough resolution to distinguish the lower frequency energy To begin with testing, a recording of a random gunshot at an unknown distance was recorded at 96 kHz sampling rate at a local shooting range. This audio was processed using MATLAB, and two FFT sizes were chosen to compare their ability to distinguish critical frequency bands $$\frac{48{,}000 \text{ Hz}}{1024} = 46.88 \text{ Hz per Bin} \quad \frac{48{,}000 \text{ Hz}}{16,384} = 2.93 \text{ Hz per Bin}$$

Figure 8A:
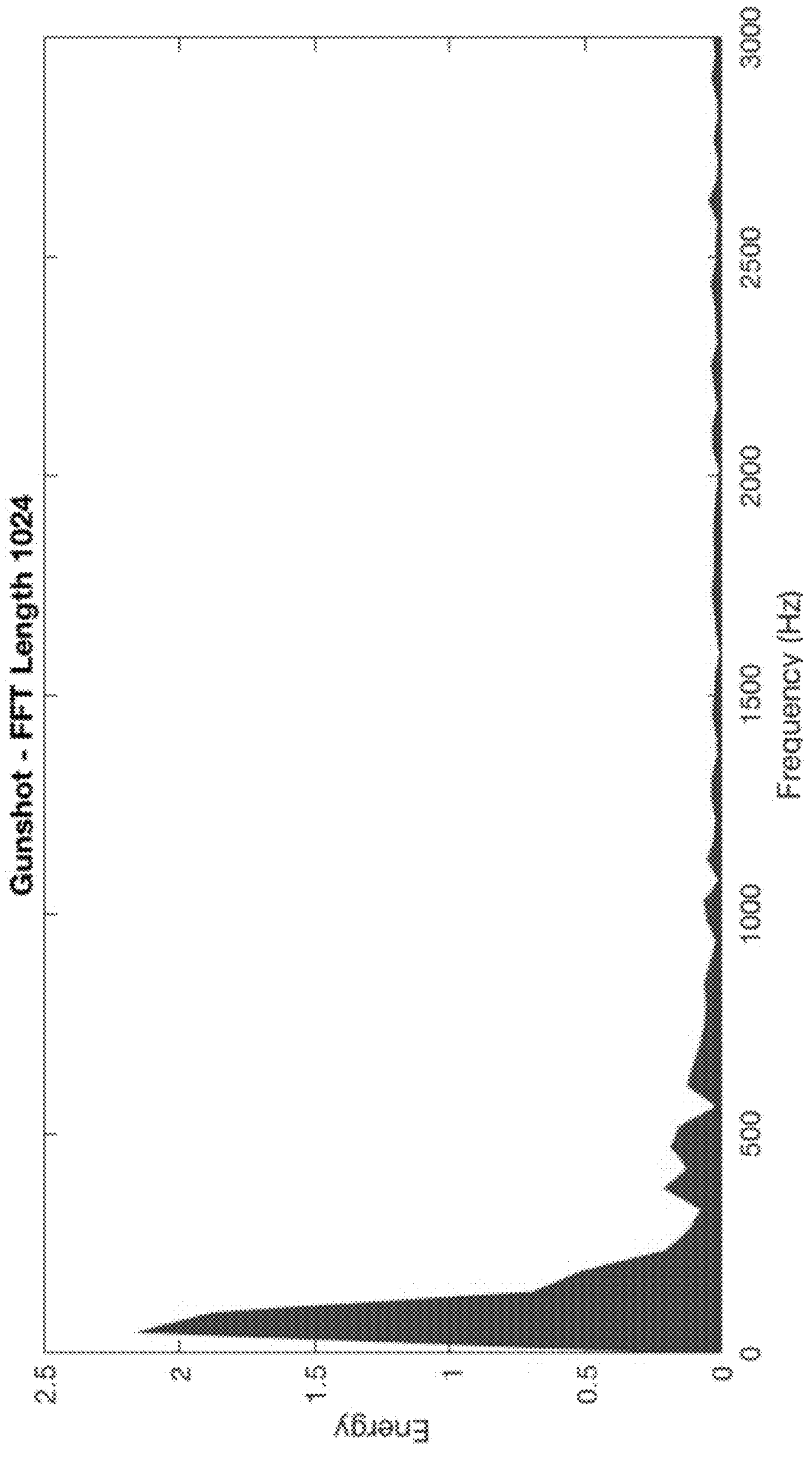
FIGS. 8A and 8B are graphical representations showing fast Fourier transform (FFT) graphs for respective FFT lengths of 1024 and 16,384 over a period of three gunshots.
Figure 8B:
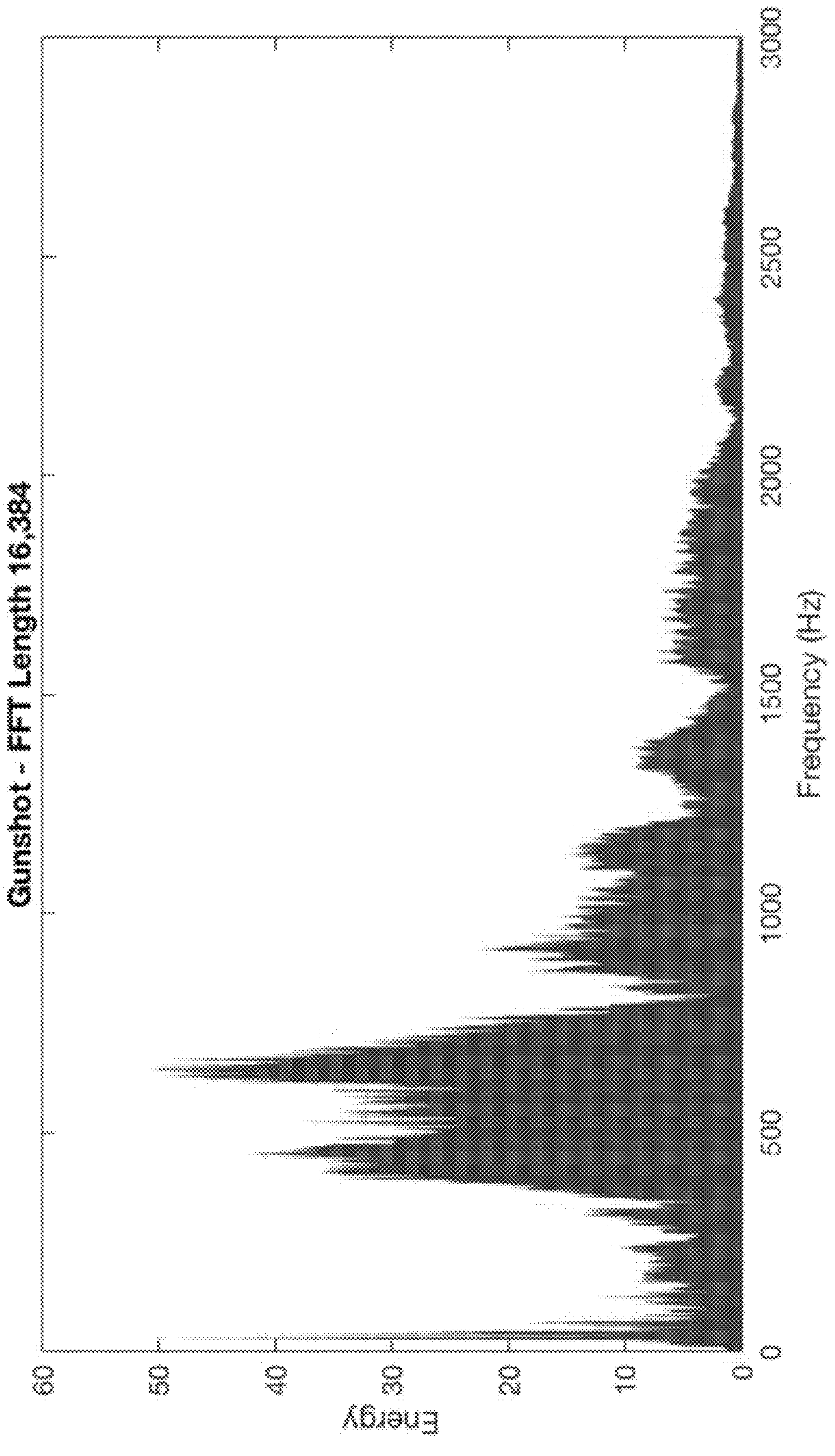
Figure 9:
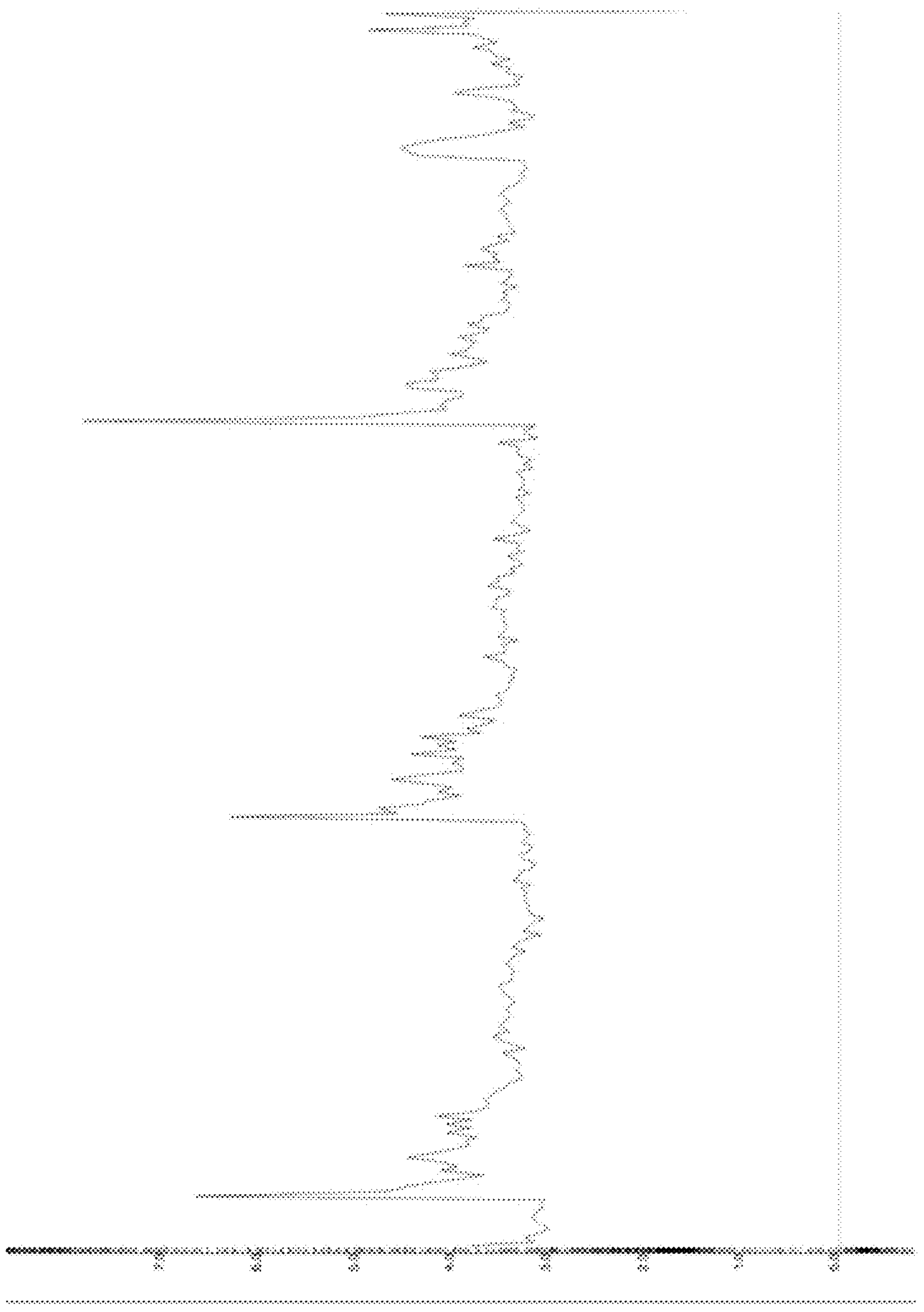
FIG. 9 is a graphical representation of loudness using Sonic Visualizer over a period of three gunshots.

The graphs and tables above display stark differences in analysis for each length choice. In FIG. 8A there is a visibly lower resolution line, however, due to the quick sample collection, the low frequencies are much more prevalent and nearly twelve times as large at 40 Hz in relation to 500 Hz. The table also displays that the resolution of Hertz per bin is nearly 47. This is not ideal as it means that from 0 Hz to about 3000 Hz (where the gunshot analysis is most critical), there are only about 63 values of averaged amplitude. If a comparison of this data is made with FIG. 8B, the graph is much more detailed, but there is a large spike in the 400 Hz to 700 Hz range that is even louder than the subsonic values of about 40 Hz that are of greater importance. This spike could be due to the long sample collection period picking up sonic events that aren't gunshots, clouding the analysis. One upside to this calculation is the width of each analysis, sitting at about 3 Hz. With this resolution, there are approximately 1,023 values of averaged amplitude from the range of 0 Hz to 3,000 Hz.

With all these variables taken into account, an FFT length of 1024 samples was chosen for this project with a window overlap value of twenty-five percent. The first bit of reasoning for this stemmed from the original concept of low data and low power. The computational power to perform the larger length calculation is nearly sixteen times that of its smaller counterpart. Secondly, the quick rise and fall of the gunshot is the most crucial piece of information, and by extending the window size, temporal smearing would make the analysis unreliable as the readout would be muddy and include sounds that we are not interested in analyzing. All this considered, it is much more beneficial in this instance to focus on the quick sampling period over frequency resolution.

Amplitude and Loudness Monitoring

As shown in FIGS. 5 and 6, following the FFT calculation shown in block 222, spectral features are extracted (block 224) to discern a gunshot from naturally occurring sounds, the first of these being amplitude 324 (also known as sound pressure level), as illustrated in block 232 of FIG. 5. On its own, the amplitude is the difference between the highest and lowest points of a signal in comparison to its equilibrium, described in units of Decibels (db). In regards to the way humans perceive sound, the larger the amplitude, the louder the sound.

Amplitude and loudness are not the same, they are related. While amplitude is a value which can be precisely measured and recreated, loudness is a perceived psycho-acoustic measurement and not perfectly definable. This feature takes into account multiple other factors such as sound pressure level and time-behavior of the sound, meaning that a sound will not be exactly the same loudness level for all individuals. With this being said, loudness was still a viable means to analyze the random gunshot recording collected to gather an idea of what the variance in energy looked like in each shot. The green line in FIG. 9 displays the loudness value over a period of several shots. This is the same recording used in the FFT example in FIG. 7; however, it includes all three of the shots captured and not just the initial one. There is a visible difference displayed each time the gunshots shockwave hits the audio sensor 110, causing a loudness spike which is approximately twice as loud from one frame to the next.

There are several factors that contribute to the successful analysis in this instance which will not always carry over to other recordings. Firstly, the loudness level of the surrounding environment is very low when the gunshot occurs, causing a more noticeable spike. This spike will be much smaller if the gunshot occurs further away, and can easily be masked out by any sound which is closer to the audio sensor 110. Even if this unwanted sonic event is identifiably softer than the shot, it will be perceived as louder due to its proximity. Secondly, the algorithm used to calculate loudness in this instance takes the full audio spectrum into account. It was made clear from the FFT that much of the energy in a gunshot is subsonic, and any energy recorded above these desirable frequencies will continuously provide false readings and incorrectly vary the feedback.

The issue of needing to only focus on the analysis of the lower part of the spectrum has a relatively simple fix in theory, as filtering can be used to only pass through the analysis on the required frequencies. As an example, a low-pass filter will only allow analysis to be made on and below the frequency 1500 Hz. This effectively rules out sounds such as high-pitched bird chirps, insects, or unwanted electrical noise. There is still a host of sounds which could be seen as a problem; cars, planes, wind, and other animals all contain energy in the 0 Hz to 1500 Hz range. For these reasons loudness on its own is not a viable means of detection, but provides a piece of information that when paired with sound pressure level (226) and spectral centroid (228) produce a robust approach.

Adaptive Background Subtraction

Background ambient sound subtraction to remove unwanted constant frequencies on an ever-changing, always adapting basis was considered. By taking spectral snapshots, or averages over periods of time to analyze constant frequencies in the spectrum that are undesired, notch filters can be applied to cut out these instances. A positive impact would be the complete removal from the incoming signal of the harmonics of the river rushing through the preserve. While this is useful, it will still only aide in constant sounds over long periods of time, issues like animal calls, wind, and passing trucks will still bypass this protection.

Importance of Spectral Centroid

While extraneous and unwanted higher frequency sounds may be an issue for monitoring loudness, there are some extractions that take advantage of this energy, the most important one being the spectral centroid. Spectral centroid is essentially the "center of mass" of the frequency spectrum as through values which were previously decoded through the FFT. While the FFT reports energy levels in each of the bins that have been created (512 in this case). The spectral centroid for that frequency snapshot is calculated by multiplying all the bin's center frequencies (ex. Bin 1=43 HZ, or (0-43), meaning its center would be 21.5 Hz) by their total energy values, then dividing by the sum of their energy values. This is displayed below:

$$\text{Centroid} = \frac{\sum_{n=0}^{N-1} f(n)x(n)}{\sum_{n=0}^{N-1} x(n)}$$

What this equation obtains is a value in Hertz that represents the average center of mass for that period of time, dependent on FFT size. Different environments have varying spectral centroid values over time. For example, a busy highway might have a very low spectral centroid during rush hour times due to the rumbling of car tires on the road and large vehicle exhaust notes, but at night as fewer cars travel the spectral centroid will rise and rest somewhere more equivalent to the natural environmental sounds around it. Because of this, if a low-pass filter or adaptive set of notch filters are applied to the incoming sound, the spectral centroid will be incorrectly weighted, and small changes might not be as observable. This sparked the research focus, as previous research proved that a majority of the creatures occupying the sonic space of the rainforest landscape are insects which tend to emit higher frequencies. During periods of sudden subsonic energy, a clear drop in the Hz value of spectral centroid should occur. Performing this initial analysis using the LibXtract toolkit provided a bit of a lackluster result on the same audio used to detect loudness, as observed in FIG. 9. The centroid hovered back and forth between 1300 Hz and 3400 Hz. The change hardly noticeable on its own, so much so that it is impossible to distinguish where exactly the shots occur without including the waveform of the audio file. This is partially due to the location of the audio sensor 110 being inside a vehicle and having close to no gain and picking up no background noise, leaving the average hovering value of the spectral centroid to be very low to begin with.

Figure 10:
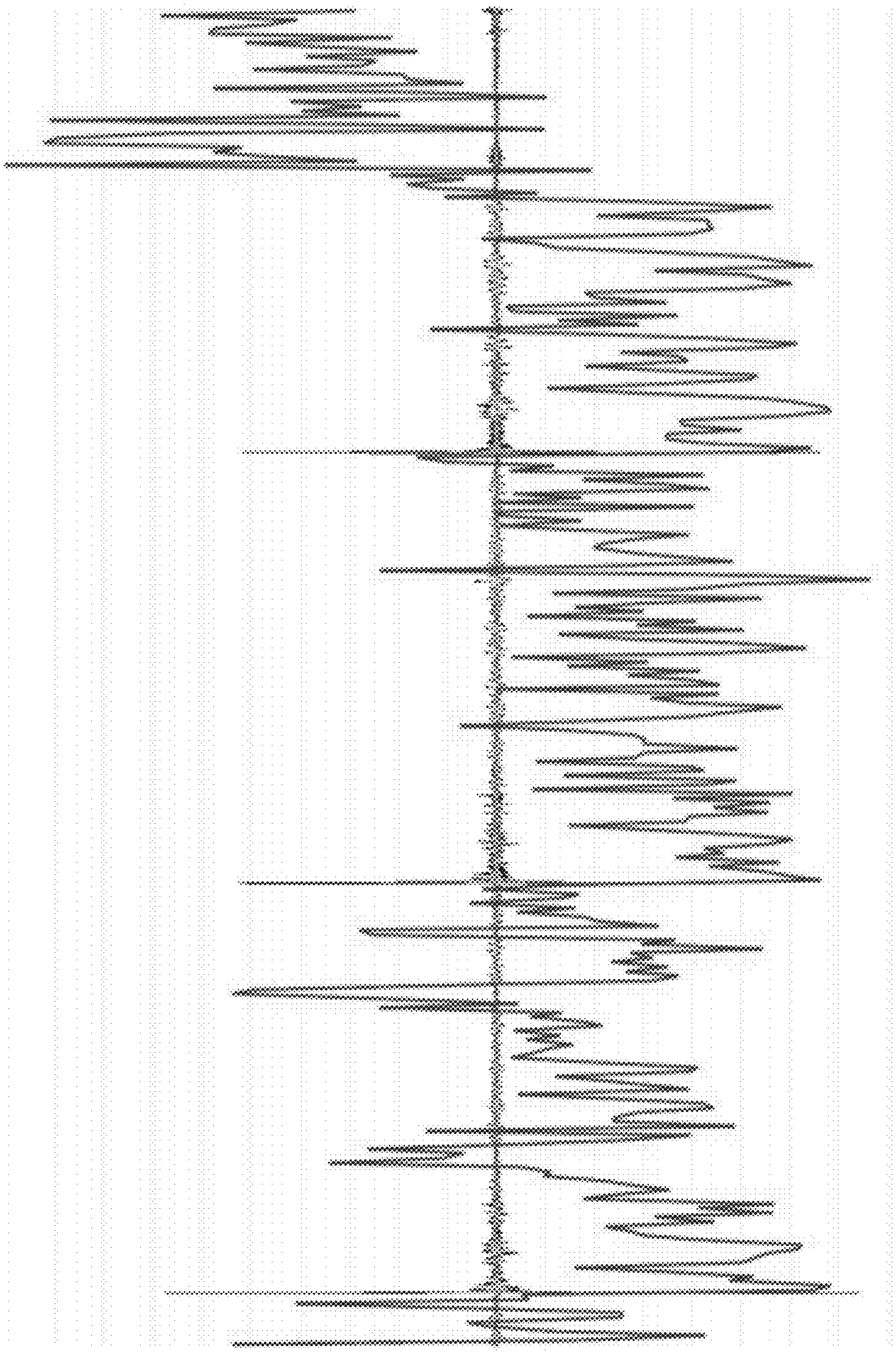
FIG. 10 is a graphical representation of spectral centroid analysis of three gunshots using Sonic Visualizer.
Figure 11:
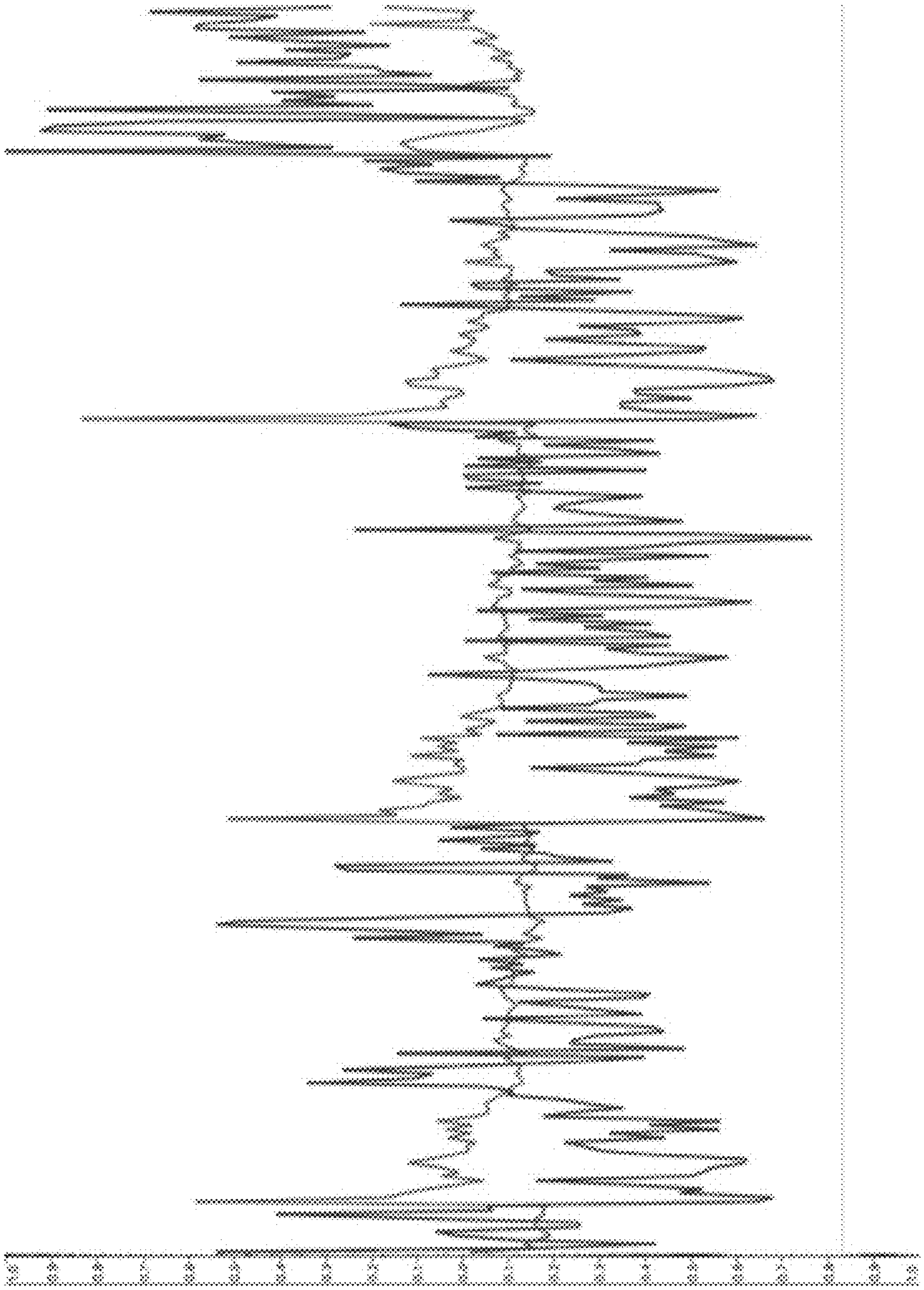
FIG. 11 is a graphical representation of spectral centroid analysis (red) overlaid with loudness (purple) in Sonic Visualizer over a period of three gunshots.

However, this becomes more distinguishable if the loudness measure (purple) is compared to the spectral centroid (red) as shown in FIGS. 10 and 11. Due to these purple loudness spikes, it is observable where there are inverse correlations in spectral centroid and loudness. It becomes clear that every time the loudness increases, there is a decline in the spectral centroid. Even though both the spectral centroid and loudness are still a bit random on their own, when working together they provide a more reliable and appropriately detectable event.

The Vector of Change

Arguably the most important piece of analysis to this detection puzzle is the vector of change, discussed in blocks 230, 232 and 234 of FIG. 5 and block 330 of FIG. 6. Other technologies often use spectral centroid to identify a gunshot by reporting if the spectral centroid passes a target threshold value (i.e. is sufficiently low to indicate a gunshot). However, these technologies reported once a target threshold was passed, not looking at the behavior of the sound in frames before the target threshold was passed. By simply looking for a target threshold to be passed, a vector of change of the quick rise and fall time of the gunshot has been disregarded. In contrast, by evaluating spectral centroid as a vector of change of the spectral centroid across a plurality of samples as described herein, a fuller picture of the behavior of the sound before and after the spectral centroid falls can be better ascertained for improved gunshot detection accuracy. Because of the large amount of subsonic energy in the gunshot event, the spectral centroid of the environment is pulled low i.e. to a lower frequency [i.e., to a lower frequency] at a very rapid rate.

Magnitude: The graphs display lines from frame to frame, and these lines are known as the magnitude. For the magnitude to be calculated, it is required to have a comparison of the previous frame ($x_1$) (first frame 406 to the current frame ($x_1$). As an example, calculating the magnitude of vectors' A to B can be written as:

$$|\overrightarrow{AB}|=\sqrt{(x_2-x_1)^2+(y_2-y_1)^2}$$

In the case of loudness, two example frames A=(5, 2.1) and B=(10, 7.8) would look like $$\begin{aligned}|\overrightarrow{AB}| &= \sqrt{(10-5)^2+(7.8-2.1)^2}\\ &= \sqrt{5^2+5.7^2}\\ &\approx 57.49\end{aligned}$$

Because the X value will always be a constant, the magnitude can be calculated by subtracting the current Y value from the previous. Because the magnitude is only reporting the magnitude of change, the value will always be positive.

Direction: The other output of the vector of change algorithm is the direction. While the magnitude is the length of the line, the direction is the angle of the line from the previous frame to the current, in reference to a horizontal line which is equal to the previous frame. The rules state that if this angle is larger, up to degrees, the larger the magnitude and therefore steeper the change. The direction of the vector can be found by calculating:

$$\tan\theta = \frac{y_2-y_1}{x_2-x_1}$$

For the same frames listed for magnitude, this would equate to $$\theta = \tan^{-1}\left(\frac{5.7}{5}\right) \approx 49^\circ$$

Unlike the magnitude, the directional vector calculation can report negative directions in degrees. Because of this, an extra layer of detection is added as it is only required to look for steep positive variation in loudness (block 232) in conjunction with steep negative variation in spectral centroid (block 234). If there is a steep negative direction change in loudness, and a positive change in centroid, the event can be ignored. In some embodiments, thresholds for steepness of both loudness and spectral centroid are determined using historical averaging. With the addition of these vector calculations along with the thresholding values, a dense layer of detection has been created which relies on over six variables of criteria to be met before a gunshot is reported. However, before being able to test this theory, collections of recordings were made to assure that the loudness and spectral centroid measurements hold true over a known data set. It is crucial to verify whether these extractions will hold true, and observe just how well they will consistently perform over a large variety of distances from the shooter.

Recording and Analysis for Data Acquisition

A large portion of the development lies in abundant collections of on-site recordings. Because of the remote location and inability to frequently access highly poached areas, over one-hundred hours of audio were captured over a five day period of fieldwork. These recordings aimed to simulate every possible situation in which a gunshot can occur in that environment, as well as document the acoustic ecology of each of these spaces. By doing so, frequency profiles of the landscape can be developed, and accurate 1:1 analysis can be made to report the reliability of the detection process and its related code.

Figure 12:
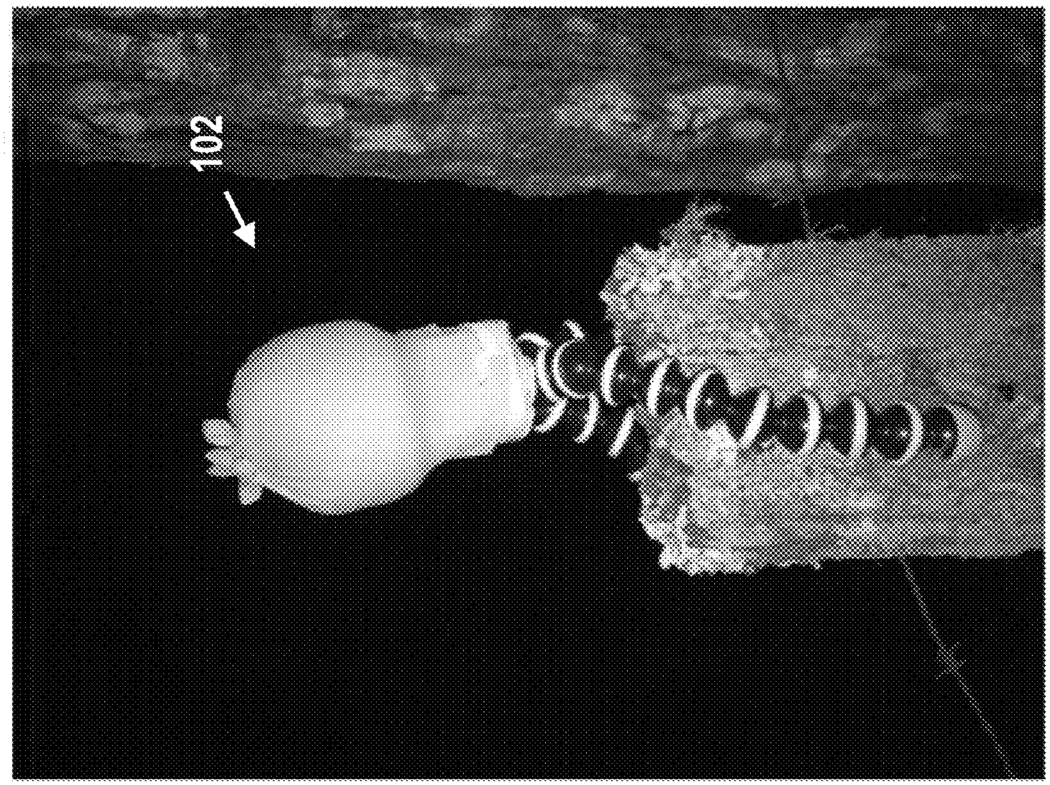
FIG. 12 is a photograph of a prototype recording device placed on a fence post and sealed with a nitrile glove and silica gel packets.

First, recordings were acquired so noise profiles of these landscapes could be developed for each time of the day. For this process, five Zoom H2N recorders (FIG. 12) were placed each day and captured approximately eight hours of audio. These recorders captured sound at 96 kHz to make sure every detail was analyzed. Their locations were marked by GPS, and each contained a description of its surrounding foliage, a timestamp, and its respective weather, including temperature and humidity. Each recorder was placed approximately 200 m away from one another, and locations were based upon previous knowledge of where poaching occurred. Because the humidity of Las Alturas can rapidly increase come nightfall throughout the dry season, all recorders were wrapped in thin nitrile surgical gloves and sealed using tape with at least two packets of silica gel inside to keep them dry and operating correctly, as shown in FIG. 12. Previous tests were performed in Arizona to ensure that the thinnest gloves did not critically alter the incoming sound, or block out the desired higher frequencies. All recorders were placed on moldable tripods and positioned a few feet off the ground wrapped around thick tree branches or fencing whenever possible. This placement off the ground meant that low rumbling frequencies from passing trucks or the rushing river were less likely to get picked up through the vibration of the tripod legs.

Regional Discoveries

Figure 13:
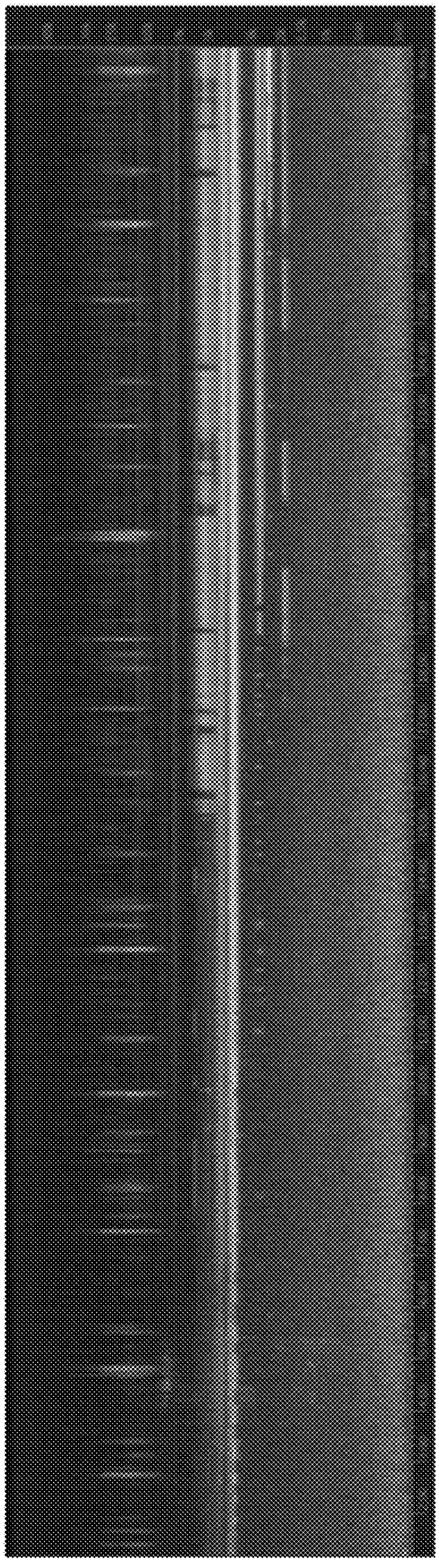
FIG. 13 is a spectrogram of ambient recorded sound devoid of gunshots.

After the five days of recording, it was clear through spectral analysis and loudness measurement that the most variance in the sound profiles of these locations came primarily from insects at dusk. In order to develop a general frequency profile of the recordings, iZotope RX was used to analyze the FFT in the time domain for the hours of audio. FIG. 13 displays the overall loudest audio and most variation in frequency content across all the recordings. This hour-long section takes place from about 6 to 7 PM. Throughout this transition into dusk, various species of crickets begin to chirp. These high-frequency chirps occupy most of the sonic space above the 2,700 Hz range and can be quite loud when close to the audio sensor 110. This is highlighted in FIG. 13 by the brightness of the orange lines extending along the x-axis. The brighter the color, the more energy there is in that frequency range for that event.

Figure 14:
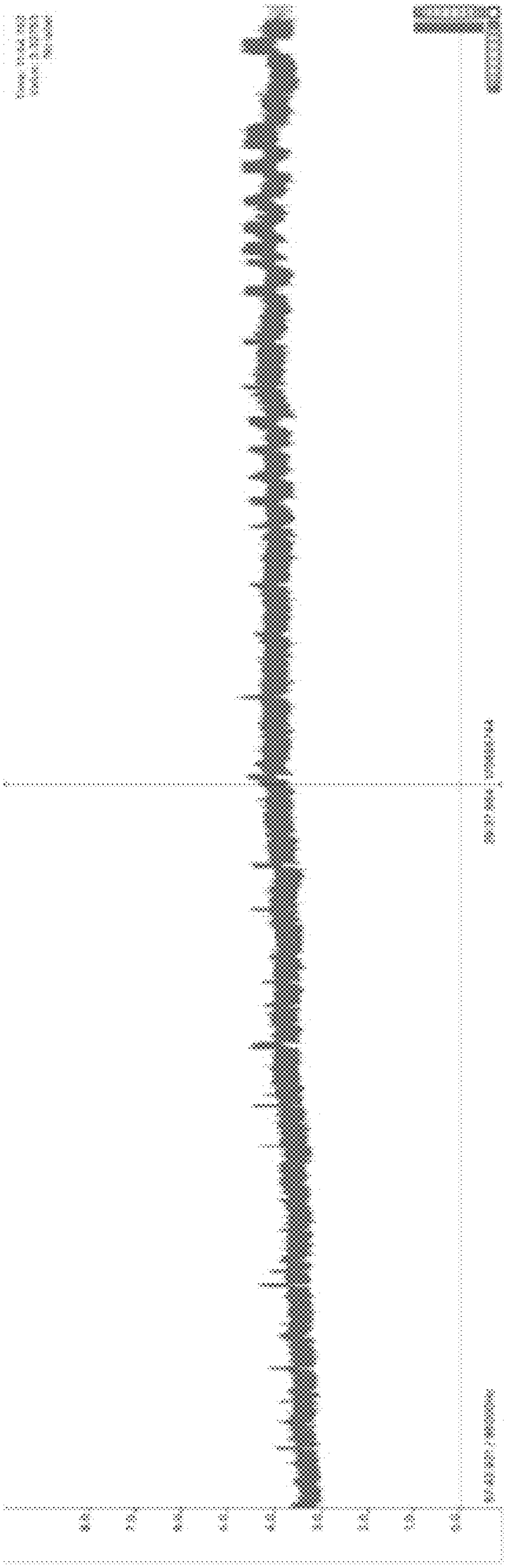
FIG. 14 is a graphical representation showing loudness of an ambient recording of sound at dusk devoid of gunshots.
Figure 15:
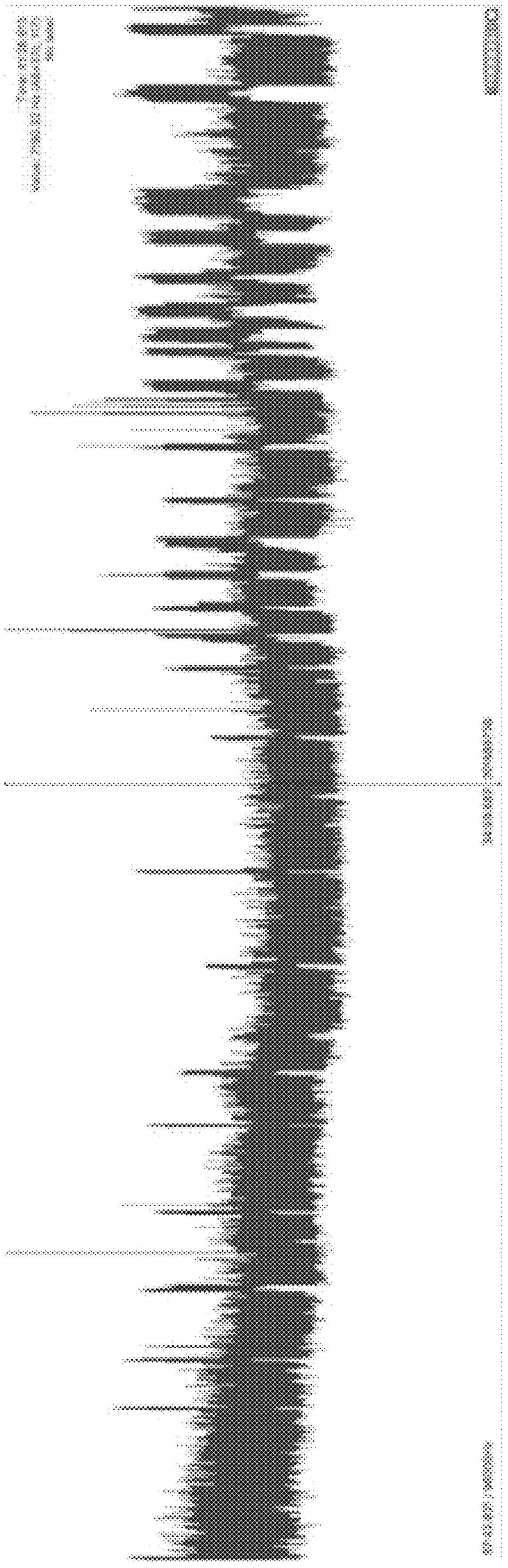
FIG. 15 is a graphical representation showing spectral centroid analysis of an ambient dusk recording.

Towards the right side of the above graph, there is a noticeable increase in the amount of sonic events in the middle of the frequency spectrum (Y-Axis). These newly introduced lines of color represent various cricket chirps at different frequencies. In theory, the more chirps that are introduced, the louder the overall audio signal becomes as sound pressure level is cumulative. To test this the same recording has been analyzed for loudness and spectral centroid in Sonic Visualizer as shown in FIGS. 14 and 15.

Although the cricket chirps reside at frequencies well above the range observable for the gunshot, there was concern that the louder chirps very close to the audio sensor 110 would overpower a distant shot, especially during dusk hours. As shown in FIG. 14, there is a slight increase in loudness over time. These chirps could also negatively affect the spectral centroid. Because the spectral centroid in FIG. 15 takes into account the average location of energy across the frequency spectrum, if the gunshot is of equal or lesser energy than the chirp in the same frame, the centroid value will not drop as drastically as indicated in a closer gunshot recording. It is clear near the right side of the spectral centroid graph that the chirps are causing a rise in Hertz values for the spectral centroid. Another possible concern found during testing was the sound of a river through the property that needed to be considered so as not to interfere with gunshot detection. In some major sections of this river, the water runs rapidly and it is evident in the spectrograms such as FIG. 13 that this low rumbling noise could be emitted for hundreds of meters. Just as the energy from the crickets could overpower the sound of a gunshot, the rumbling of the river was a greater concern because it resides in the same frequency range as the subsonic muzzle blast of the gun. It would not be possible to verify whether or not this would hinder detection until gunshots were recorded in these locations.

The Inverse Effect of Enemy

Two of the five days spent collecting audio also involved controlled gunshot collection. During this time two contrasting locations were chosen to simulate likely experiences in which gunshots would occur. These controlled tests included placement of audio sensors 110 at measured distances facing specific directions, as well as weather documentation, time-stamping, and efforts to suspend the units off the ground to emulate their future placement just below the canopy.

Figure 16:
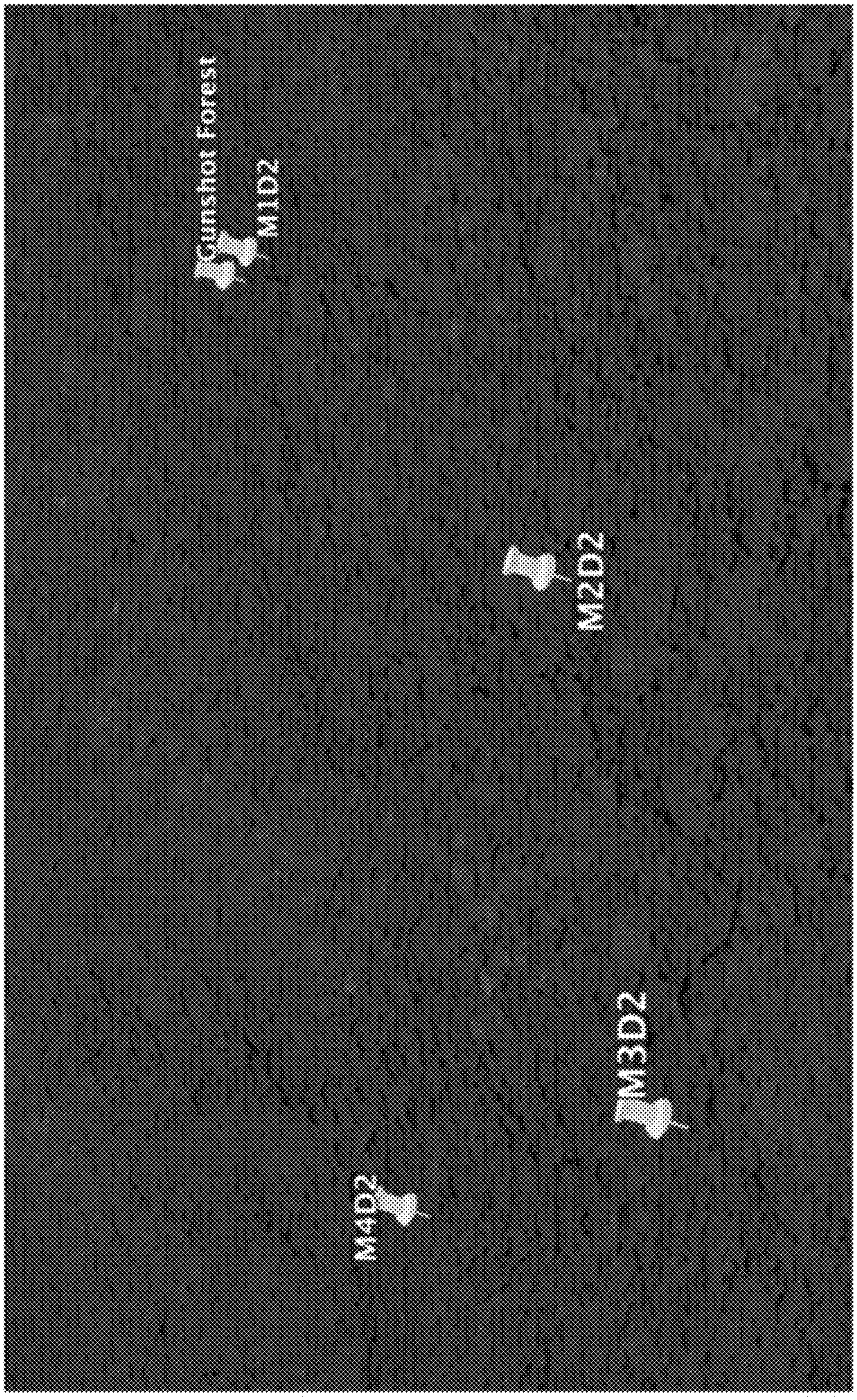
FIG. 16 is a map showing recorder locations for forest gunshot testing.
Figure 18:
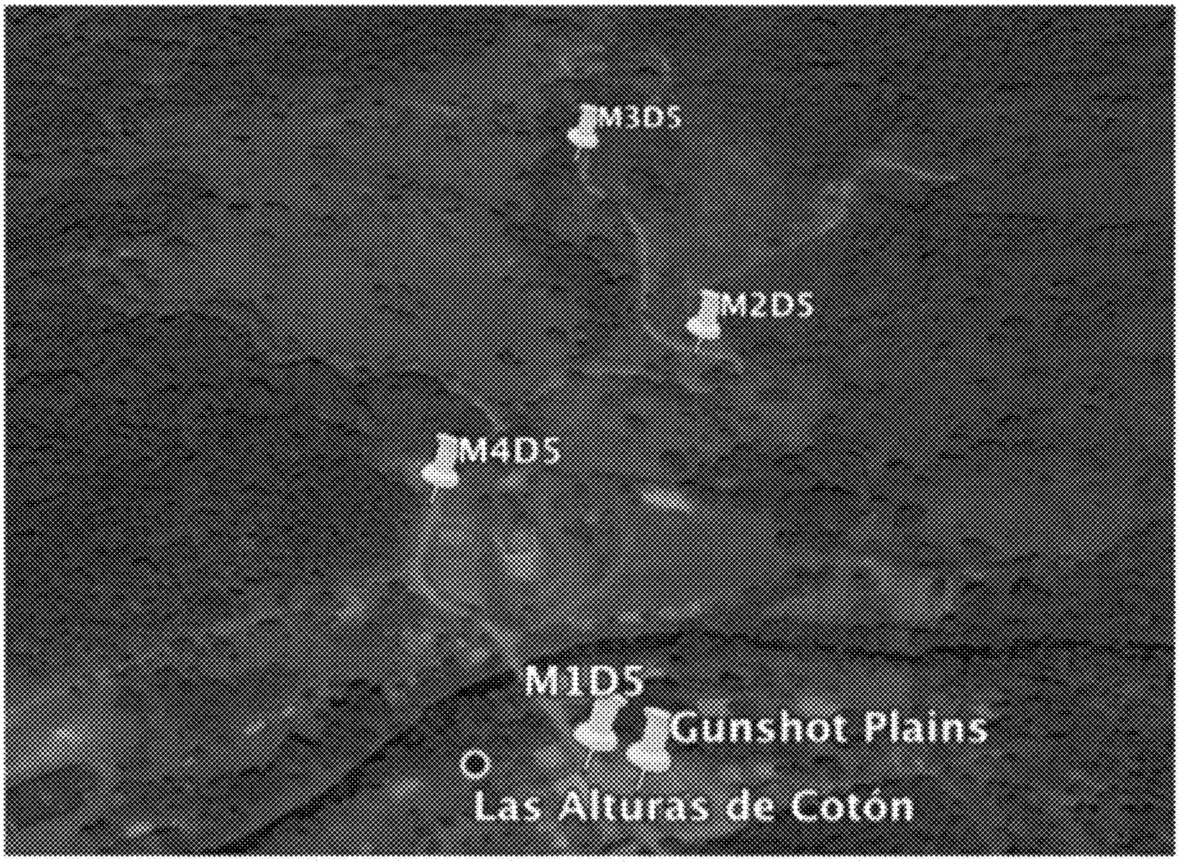
FIG. 18 is a map showing recorder locations for initial testing of the system.
Figure 19:
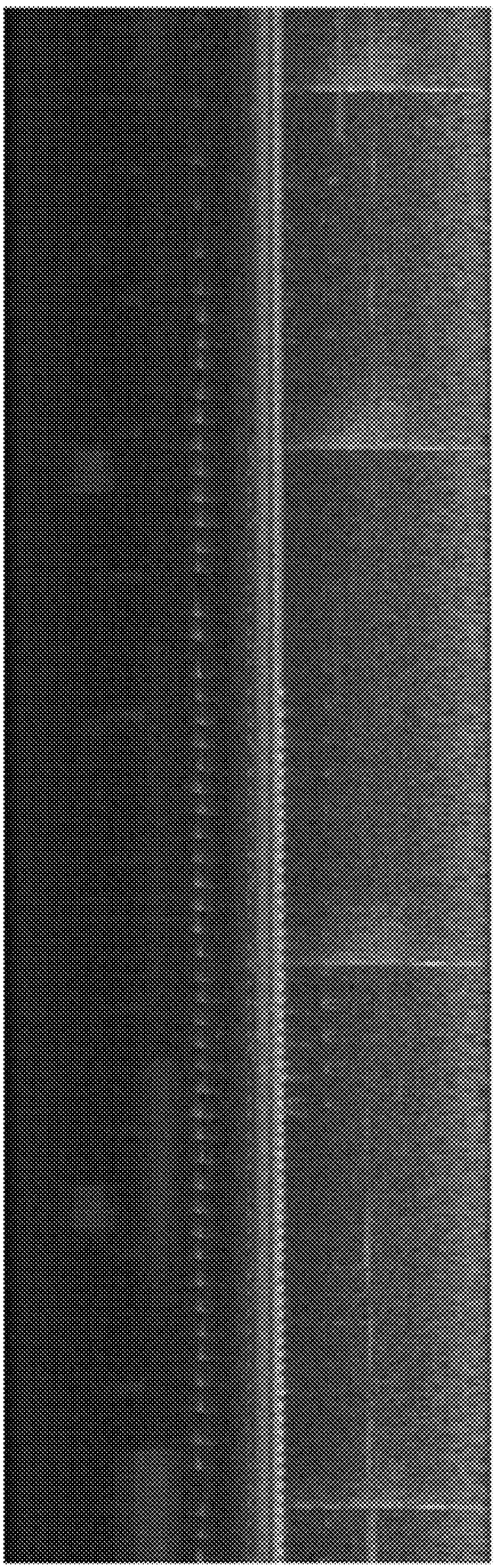
FIG. 19 is a spectrogram of the plains gunshots of FIG. 18 from 960 m.
Figure 20:
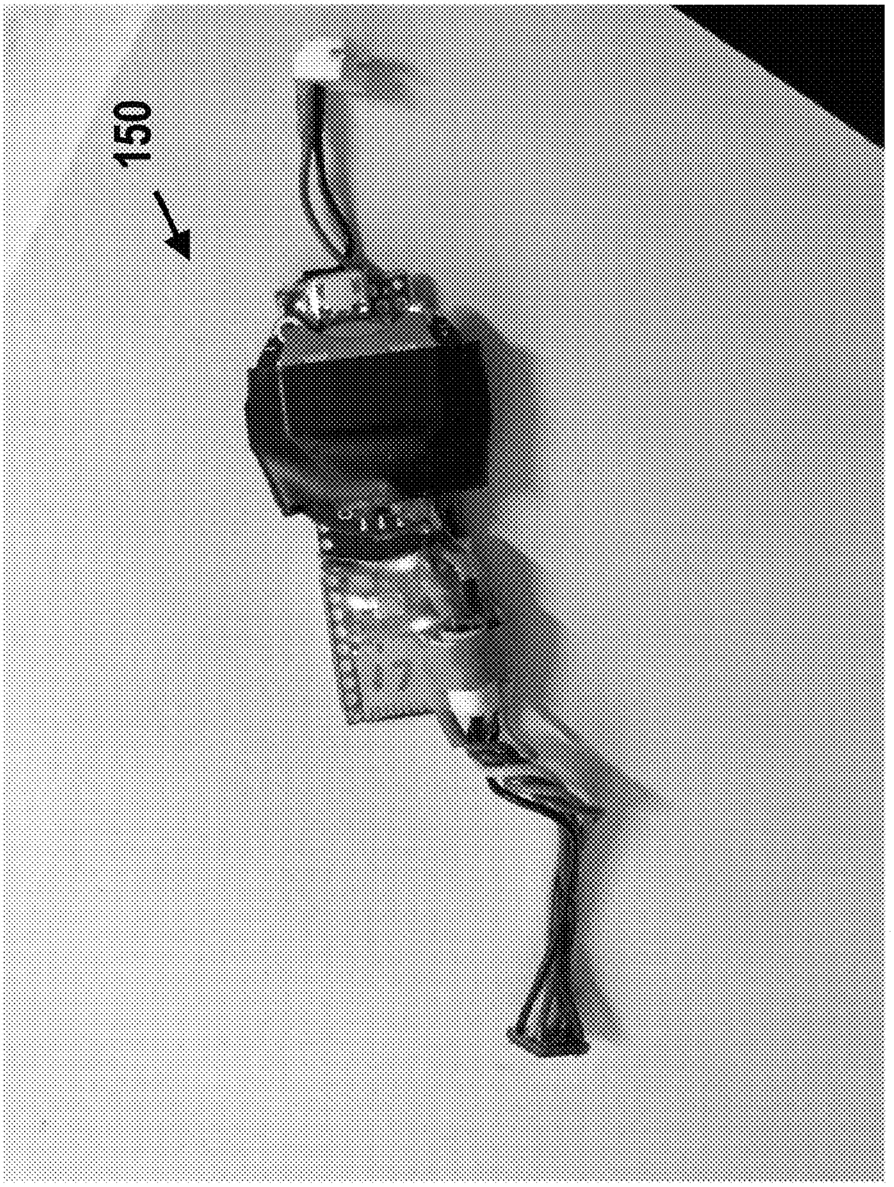
FIG. 20 is a photograph of an embodiment of hardware components of the system of FIG. 1.

The tests were performed in a very dense area of foliage along a path where poaching occurs frequently, due to a public road intercepting private land, as seen at mark M2D2 in FIG. 16. It was predicted that the supersonic bullet crack would reduce in amplitude at a shorter distance than that of the subsonic boom of the muzzle blast. This is evident in the analysis shown in FIG. 17A. The graph highlights a one-minute section cut from M3D2 at 770 m from the point-of-shot. Due to the higher frequency energy of the forests natural sounds, there is a very noticeable and quick drop in spectral centroid (shown in green) from ~5500 Hz to ~1700 Hz when the gunshot is introduced, and a gradual increase back to its resting centroid following the reverberant crack of the bullet. This is mirrored by an opposite spike in loudness which can be observed in purple. As the audio sensors 110 are placed closer to the gunshot, the results are even more apparent, this can be observed in FIG. 17B which was recorded 15 m from the firearm. The speed at which these values change remains constant, but the closer to the shot, the larger inverse effect of sound pressure level versus spectral centroid is observed. FIG. 16 also illustrates other gunshots of forest gunshot testing, reflected as “M4D2”, “M3D2”, and “M1D2”; and FIG. 18 illustrates other plains gunshots for testing reflected as “M1D5,” “M4D5”, “M2D5”, and “M3D5.”

Not all poaching occurs in dense forest so a second round of shots was completed in a more open area of the preserve. The recording was also completed at dusk so the ambient loudness of the surrounding area is much higher than the last data gathering session, and a larger number of crickets are audible. Observable changes in spectral centroid and loudness can be seen in all graphs from all four audio sensors 110 placed. Because of this, it is most important to observe Microphone 3 as it is nearly 1 km away from the shooter, the furthest distance recorded. Not only this, but all tests were performed using a .22 caliber long rifle, the smallest caliber used by poachers. This smaller caliber is the quietest and least powerful, so if detectable at this distance then any larger caliber will also be detected. Upon listening to the recording the gunshot is hardly detectable to human ears, but analysis proves numerical evidence that there is a unique drop in spectral centroid with a very steep vector of change in sound pressure level.

Figure 17A:
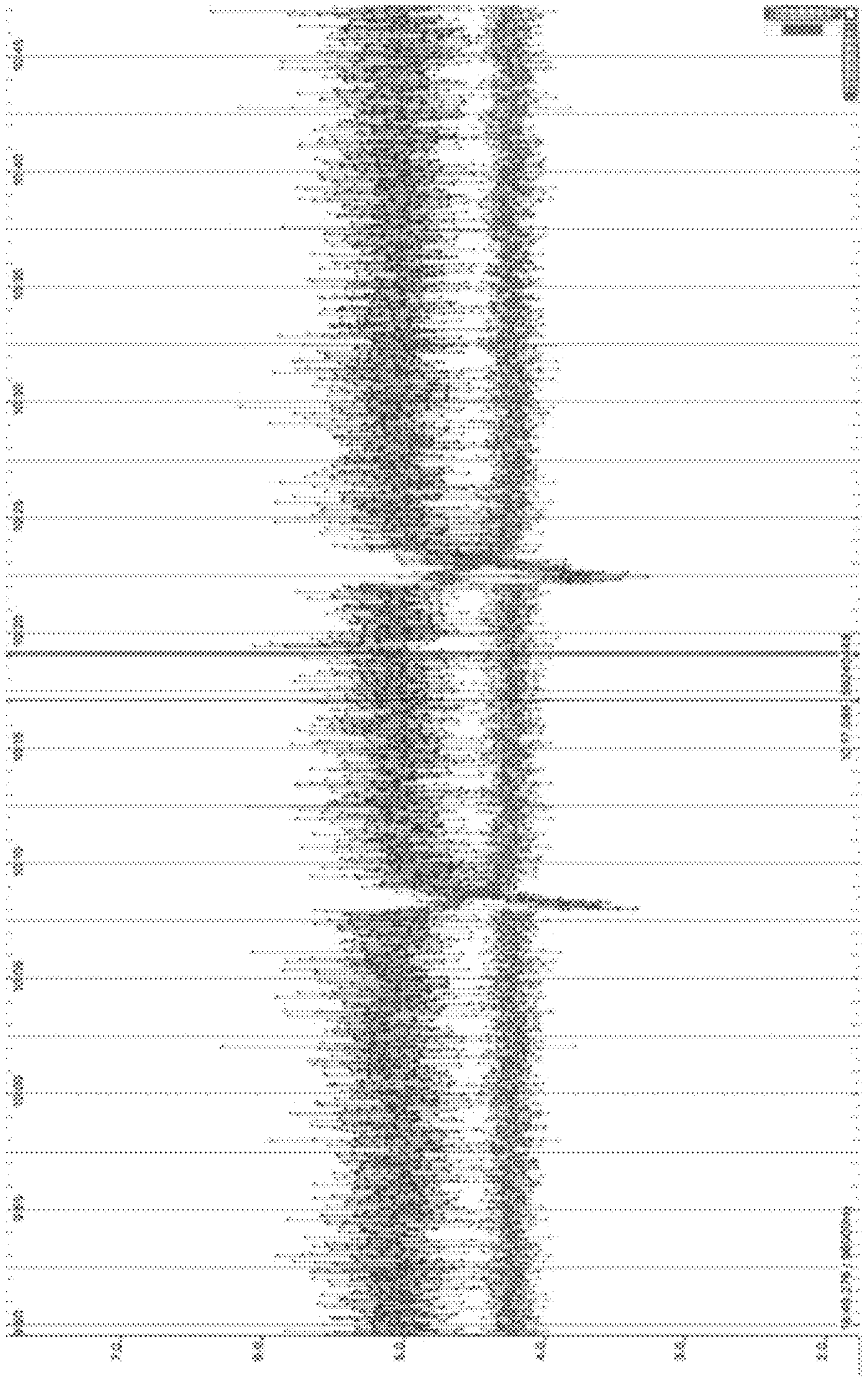
FIGS. 17A, 17B and 17C are graphical representations showing spectral centroid analysis (green) and loudness (purple) during a gunshot tested with the setup of FIG. 16 and heard from distances of 770 m, 15 m, and 960 m respectively.
Figure 17B:
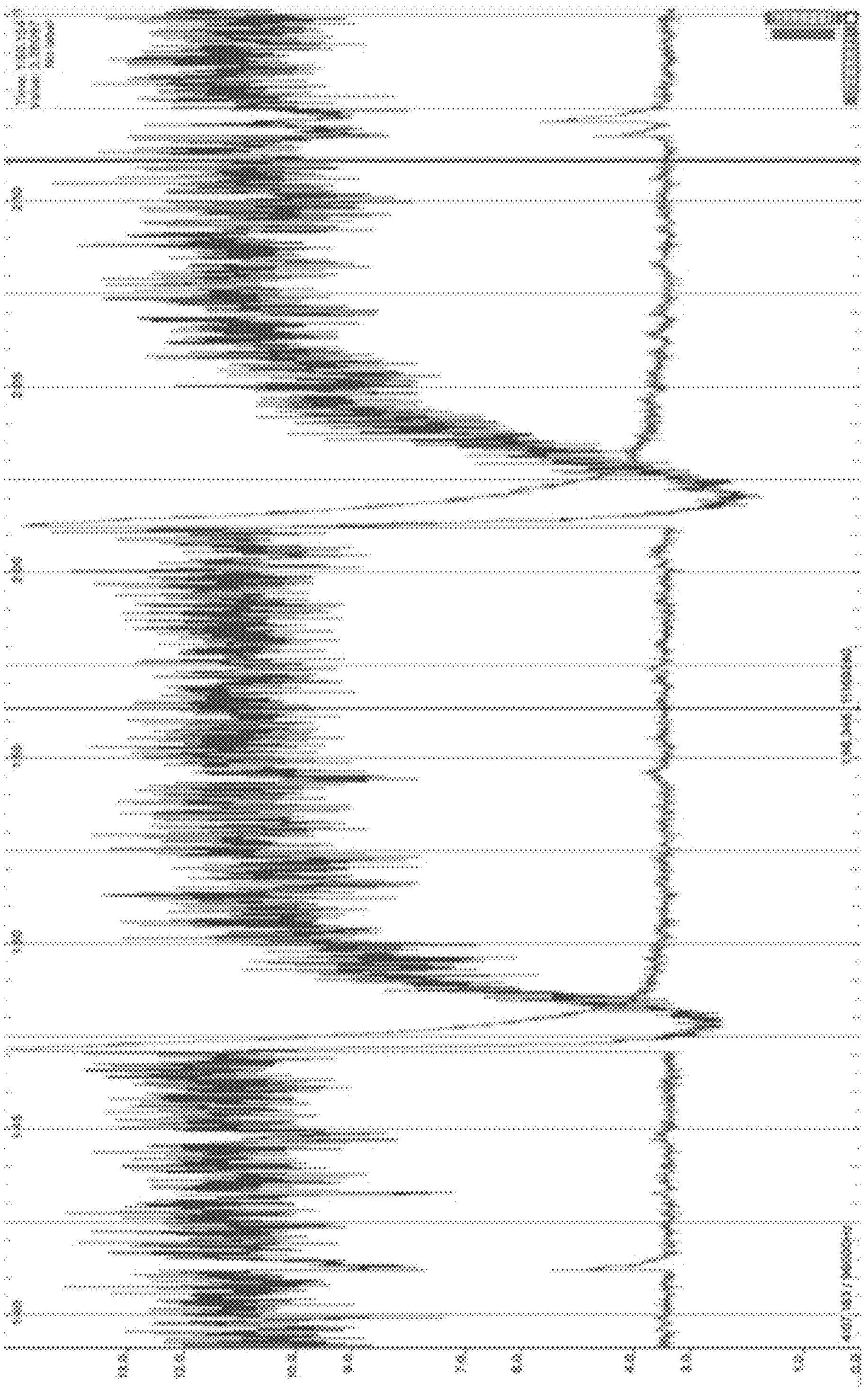
Figure 17C:
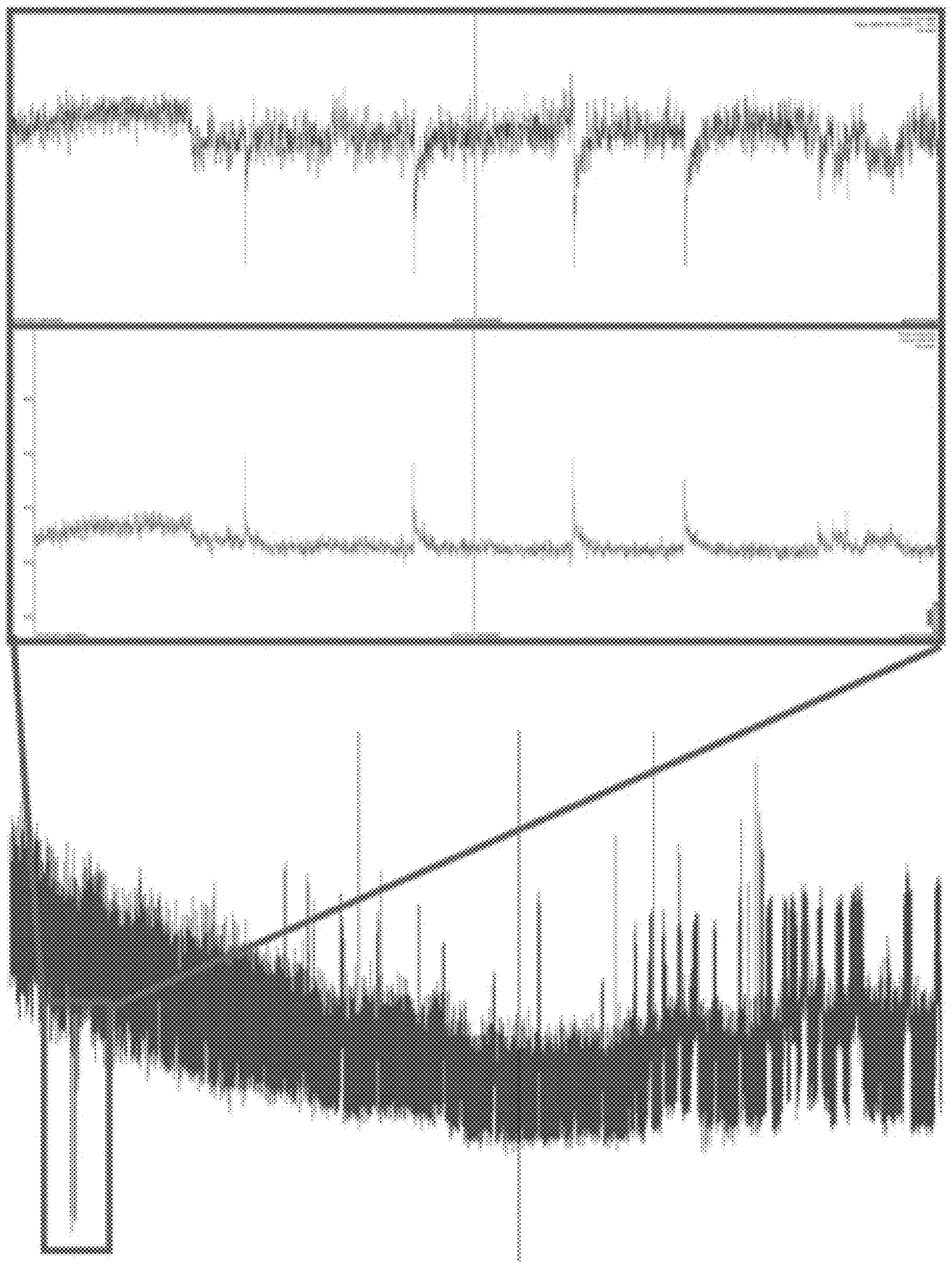

The difference in spectral centroid is so drastic that if zoomed out to a sixty second clip of the full hour long recording in FIG. 17C, there are four extremely visible instances where the spectral centroid value drops that is unparalleled in any other sound events.

Validation of the Vector of Change

These controlled gunshot recordings and their respective analysis gave verification that monitoring the vector of change for both spectral centroid and loudness is a viable option for reliable detection. When combined with the inverse properties of these two metrics, they provide an extra layer of confirmation for a possible gunshot event. Not only has this been verified, but its inclusion has proved that it is also a viable option instead of performing adaptive background subtraction and cancellation. This frees up data and power to fit along the goals originally set forth for this project. The spectral centroid calculation takes into account every bin of frequency and averages it to output the weighted value in Hz. This means that altering the incoming audio before it can be processed would negatively affect the spectral centroid. There is a reliance on the high-frequency crickets to make the spectral centroid variance more drastic, and if filtering was introduced to subtract the low rumble of the river, it would cancel out the necessary frequencies to monitor subsonic shots. This vector of change gives the ability to ignore constant or unchanging background, environmental sounds, and because the only observable values of difference are from frame to frame, the rumble of the river will not come in to play as it never stops or rapidly changes.

While many positive results stemmed from these controlled audio collections, it was also noted that placement of these audio sensors 110 will play an important role in the natural sounds they pick up. Because they included plastic tripods wrapped around trees, they are still much closer to the ground rather than the proposed canopy-line placement of the final units. This could have introduced unwanted low-energy into the audio which would be mitigated upon their proper placement.

Building Code

Chosen Hardware for Implementation

Figure 22:
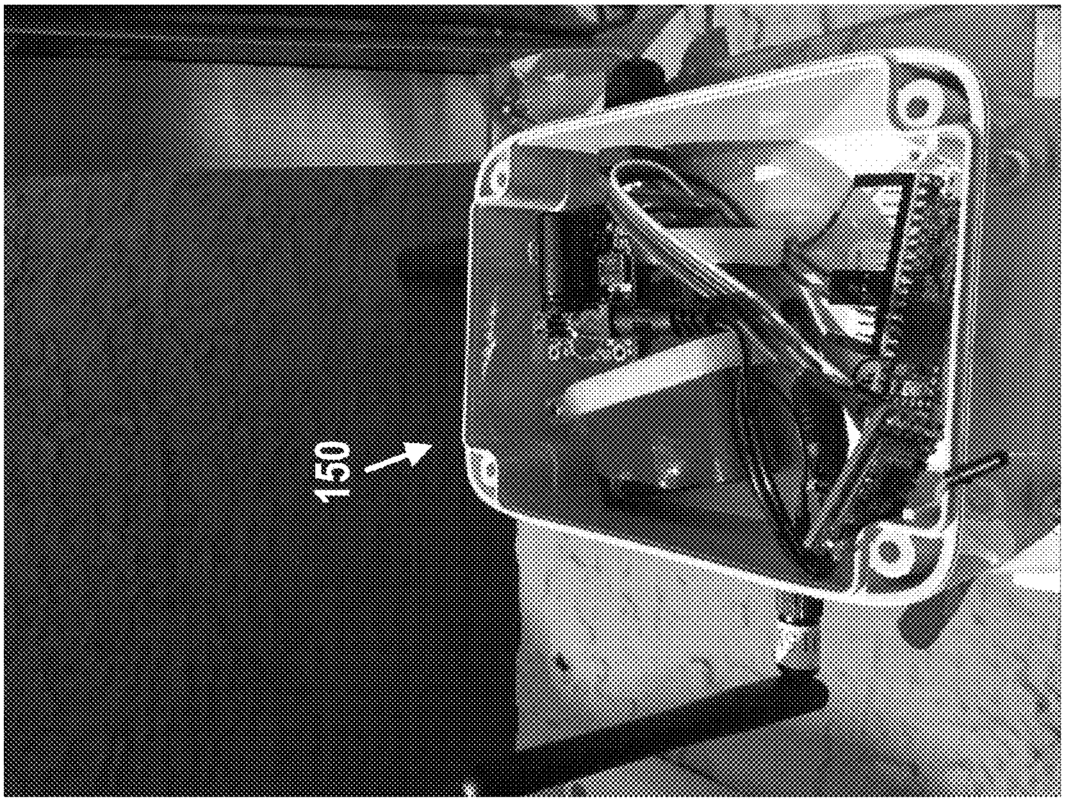
FIG. 22 is a photograph showing an alternate view of hardware components of the system of FIG. 1.
Figure 23:
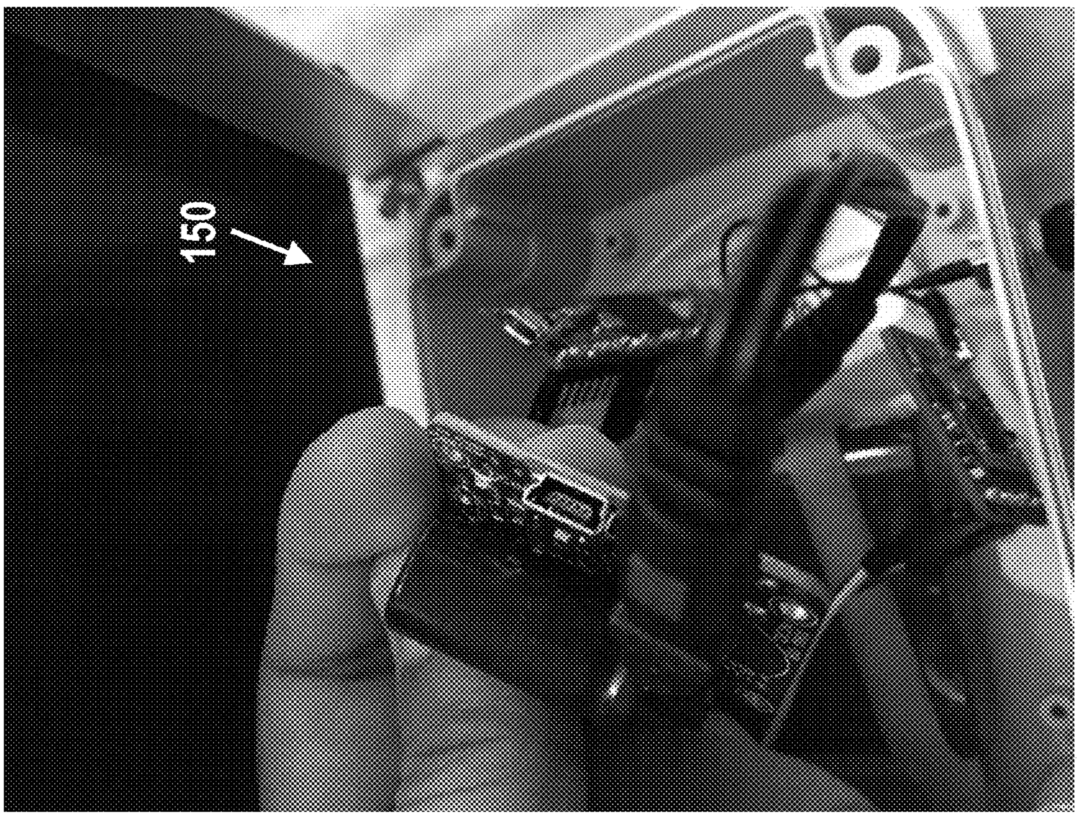
FIG. 23 is a photograph showing an alternate view of the hardware components of FIG. 22.

One embodiment of a hardware setup 150 is shown in FIGS. 3, and 21-22. A processor 140 was used for initial development in conjunction with an audio board 160. This board allows a computer to access the processor 140 as audio output. By doing so, audio can be passed through the board to be analyzed in real-time, instead of preloading & running the files from a micro-SD card (removable storage medium 135). This was necessary as the amount of audio collected on-site for analysis was very large, making the transfer to an SD card not possible for more than one file at a time. This playback through the device also simulates the exact conditions under which an audio sensor 110 would be connected to the unit and listening.

Initial MATLAB Method Principles

The use of the LibXtract toolkit within Sonic Visualizer provided sufficient visualization of spectral feature extraction, allowing for positive identification of the inverse energy and spectral centroid theory disclosed herein. However, before beginning to build this code in C/C++ and the Arduino IDE, it was necessary to compare the Sonic Visualizer output to an alternate output from an industry standard program to verify correctness.

For this reason, MATLAB was chosen to perform FFT and feature extractions, and the associated graphs were compared to those generated within Sonic Visualizer. Simulink's "Audio Toolbox" is a widely trusted set of tools for performing these extractions. The first of these extractions regarded the performance of an FFT. This code receives various inputs as laid out in chapter two to create an FFT graph from an audio file, the graphs created can be viewed in FIGS. 8A and 8B. This code allowed for accurate plotting of feature extraction points. It was through these tests within MATLAB that the distinction and decision to choose energy over loudness was made. The mathematical calculation to convert the energy of a signal to the psycho-acoustic parameter loudness involves another level of multiplication in order to better represent what human's perceive. This calculation is not necessary for purposes of this project as the energy metric provides sufficient information.

Calculating the FFT and Energy

A key analysis component of the Teensy Audio System Design Tool features a 1024 point FFT component. Applying this component in the design tool interface builds code that prepares the Teensy board to perform this FFT on audio data played back by a medium of choice, this can include the available micro-SD card slot, or directly as the computer output. The output of this module includes 512 frequency bins each with approximately 43 hz of data per bin. Each of these bins reports its respective energy eighty-six times a second, and multiple bins can be grouped together or averaged. This can be useful to keep processing power usage low, by averaging the groups of frequencies deemed unnecessary for the application. By writing these energy values to an array every frame of calculation, a spectrum of all 512 bins can be created. For the purposes of low power consumption, an array of twenty values was created for this project, and the less important frequencies above 1500 hz were combined together and averaged in groups of 10's, 50's and 100's. This division of bins allows for a higher frequency resolution in the sub-1500 hz region, frequencies that will be relied on for energy analysis of the subsonic gunshot. These divisions of bins can be viewed in the primary bulk of code for this project located in Appendix B. Before being able to calculate the vector of change, the difference in energy must be noted. It was discovered during this process that although all 512 bins of the FFT analysis must be computed in order to complete the spectral centroid following the energy analysis, it is not necessary to use its respective twenty energy values written in the array. For example, it is possible to only pull the first six values for energy, essentially allowing for the energy to be measured in the 0 hz to 1500 hz range. This process bypasses the need of any low-pass filtering. In order to calculate the difference from frame to frame, values of the array are summed and averaged, then subtracted from the previous frames total. The code below displays the first 10 bins being siphoned into a six value array named "level."

```
level[0]=myFFT.read(0),
level[1]=myFFT.read(1),
level[2]=myFFT.read(2),
level[3]=myFFT.read(3, 4),
level[4]=myFFT.read(5, 6)
level[5]=myFFT.read(7, 8),
level[6]=myFFT.read(9, 10),
```

Upon completion of this process, the current energy is written in to the variable "previous energy," and as the process begins again this keeps an up to date difference in energy, eighty-six times per second. This energy difference value is then stored within a variable to be used during the vector of change calculation.

Upon completion of this process, the current energy is written in to the variable "previous energy," and as the process begins again this keeps an up to date difference in energy, eighty-six times per second. This energy difference value is then stored within a variable to be used during the vector of change calculation.

Calculating the Spectral Centroid

Mathematical computation of the spectral centroid revolves around the FFT calculation and application of the equation disclosed herein. Appropriate representation of the centroid relies on an unfiltered audio input, resulting in all twenty values written to the array from the FFT calculation being used. As previously stated, higher frequency energy will need to be present in order to see a drop in centroid upon the arrival of the subsonic waves to the audio sensor 110. To calculate this value, the energy reported in each bin, or group of bins, is multiplied by its mean Hertz value. This means that for bin 0 which is represented as 0 hz to 43 hz, the energy value would be multiplied by 21.5 hz. This process occurs for every value in the array separately. Once calculated, all respective array values are summed, and then divided by the summed value of energy for that frame. This calculation outputs a value in Hertz which represents the weighted average of energy in that frame. While the spectral centroid value in Hertz is kept as a necessary variable which will be analyzed with a threshold, the difference calculation must also be computed similar to energy, so that the vector of change for the spectral centroid can also be calculated. This is performed in the same manner, by subtracting the current centroid value from the previous frames.

Vector Math in C/C++

Once difference values for both the energy and spectral centroid are calculated it is possible to analyze the vector of change for both variables. Using the equation disclosed herein, the magnitude value for energy can be calculated in the code as such:

```
hyp=(sqrt((pow((adj),2)+(pow(diffLevelAvg,2)))))
```

The variable "hyp" in this instance is the hypotenuse (c) of a right triangle, while "diffLevelAvg" is the opposite side (b) and "adj" refers to the adjacent side (a). This can be further explained by the Pythagorean Theorem.

Because this code is being called 86 times per second, the value "adj" will always be a constant. For purposes of continuity, the variable is declared as 1024. Because the opposite (diffLevelAvg) is calculating from frame to frame, this value represents the energy level difference of the current frame minus the previous. This final equation can be written as:

$$|\overrightarrow{AB}|=\sqrt{(x_2-x_1)^2+(y_2-y_1)^2}$$

$$hyp=\sqrt{adj^2+diffLevelAvg^2}$$

This equation will return the magnitude of the desired value. The same equation can apply for both energy and spectral centroid, as long as the respective difference value is input for opposite (b) as shown:

```
SChyp=(sqrt((pow((adj),2)+(pow(diffCentroid,2)))));
```

Once the magnitude is calculated, the direction vector may be derived. This value will return the angle difference from frame to frame of both energy and spectral centroid.

Final Testing and Results

Accuracy of Detection

In order to measure accuracy of detection, a host of tests from gunshot recordings at several distances were played through the Teensy 3.2 via means of the audio output from the computer. Each of the compositions included 100 shots from every distance to replicate one-hundred shots that may occur in the field. In order to test reliability, only one set of thresholds was created that would be used for all distances. Strenuous tuning of the system before these tests proved that there is no simple answer to fulfill all needs. Two locations were tested, the plains, and the forest of Las Alturas del Bosque Verde in Costa Rica.

Plains test location (out of 100 total shots)

| | Distance | | | | |
|---|---|---|---|---|---|
| | 20 m | 250 m | 610 m | 960 m | TOTALS |
| Total Detections | 104 | 102 | 100 | 97 | 97.75% |
| False Positives | 4 | 2 | 0 | 0 | 6 |
| Missed Detection | 0 | 0 | 0 | 3 | 3 |
| Error Rate | 4% | 2% | 0% | 3% | 2.25% |

It was evident through testing that a more sensitive set of thresholds favored quieter shots, recorder further from the source, but was more prone to false positives during closer shots (250 m meters or less), as amplitude levels extended through multiple frames due to reverberation at close distance. Although these recordings attempted to take into account all variables, they were not perfect. For one, all recorders mounted to tripods were still subject to low-frequency vibrations being carried through the tripod's legs, causing extraneous energy and unwanted spikes in amplitude during closer shots. Placement higher up in the forest canopy (as intended in the final deployment) will mitigate this issue. For this reason, a more sensitive set of thresholds was chosen to provide accurate detection at long ranges, while risking a few false positives on very close proximity gunshots as a trade-off. It should also be noted that once these units are placed in the canopy, the likelihood of a gunshot occurring at 20 m is very low due to the large areas of monitoring desired, and it would be wiser to prepare the units for softer gunshot detections. Lastly, all false positives occurred in the frame following a gunshot due to amplitude values lasting more than one frame, and none were caused by the natural sonic environment.

Forest test location (out of 100 shots)

| | Distance | | | | |
|---|---|---|---|---|---|
| | 15 m | 407 m | 770 m | 750 m | TOTALS |
| Total Detections | 109 | 103 | — | — | 94% |
| False Positives | 9 | 3 | — | — | 12 |
| Missed Detection | 0 | 0 | — | — | 0 |
| Error Rate | 9% | 3% | — | — | 6% |

Results from these controlled tests show that the current detection algorithm with a single set of thresholds reports an accuracy of 97.75% up to 960 meters in the plains, and 94% up to 407 meters in the forest. The reports also display the need for a specific distance from the service road upon final placement in order to mitigate road noise masking the gunshot sound. Although vehicles accessing this road is very uncommon, it can mask the incoming energy from gunshots up to 120 m from the vehicle. Further testing with vehicles and the road would need to occur before concluding with the optimum distance from the road to minimize undesired sound masking.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. An audio sensing device, comprising:

an audio sensor operable for receiving a sound and generating audio data descriptive of the sound;

a processor in communication with the audio sensor and configured for executing instructions which, when executed, cause the processor to:

receive audio data descriptive of the sound from the audio sensor;

transform the audio data into a plurality of frequency domain frames;

determine a first amplitude of a first frequency domain frame of the plurality of frequency domain frames and a second amplitude of a second frequency domain frame of the plurality of frequency domain frames;

determine a first spectral centroid of the first frequency domain frame and a second spectral centroid of the second frequency domain frame;

determine if a steepness of an amplitude difference vector between the first amplitude and the second amplitude is indicative of a sharp increase in an amplitude of the sound;

determine if a steepness of a spectral centroid difference vector between the first spectral centroid and the second spectral centroid is indicative of a sharp decrease in a spectral centroid of the sound; and indicate if the amplitude difference vector is indicative of a sharp increase in an amplitude of the sound and if the spectral centroid difference vector is indicative of a sharp decrease in a spectral centroid of the sound, wherein the processor detects a gunshot by computation of a vector of change from the audio data, the vector of change including outputs of a direction and a magnitude that reflect a quick rise and fall time of the sound indicative as to a presence of the gunshot.

2. The audio sensing device of claim 1, further comprising:

a wireless transmission module associated with the processor and configured to communicate a device identifier to an external computing system if the amplitude difference vector is indicative of a sharp increase in an amplitude of the sound and if the spectral centroid difference vector is indicative of a sharp decrease in a spectral centroid of the sound.

3. The audio sensing device of claim 2, wherein the wireless transmission communicates identifying data including one or more values related to spectral centroid or amplitude of the audio sound to the external computing system if the amplitude difference vector is indicative of a sharp increase in an amplitude of the sound and if the spectral centroid difference vector is indicative of a sharp decrease in a spectral centroid of the sound.

4. The audio sensing device of claim 1, further comprising a housing, wherein the audio sensor and the processor are disposed within the housing.

5. The audio sensing device of claim 1, further comprising a removable memory in communication with the processor, wherein the processor stores the audio data descriptive of the sound on the removable memory.

6. The audio sensing device of claim 1, wherein each frequency domain frame of the plurality of frequency domain frames is associated with a unique time interval of the audio data.

7. The audio sensing device of claim 1, wherein the processor is further operable to:

compare the amplitude difference vector with a threshold to determine if the amplitude difference vector is indicative of a sharp increase in the amplitude of the sound.

8. The audio sensing device of claim 1, wherein the processor is further operable to:

compare the spectral centroid difference vector with a threshold to determine if the spectral centroid difference vector is indicative of a sharp decrease in the spectral centroid of the sound.

9. A system, comprising:

a plurality of audio sensing devices, wherein each audio sensing device of the plurality of audio sensing devices includes an audio sensor in communication with a processor, wherein the processor is operable to:

generate audio data descriptive of a sound;

determine if the audio data is indicative of a sharp increase in an amplitude of the sound and a sharp decrease in a spectral centroid of the sound; and transmit one or more values indicative of the audio data if the audio data is indicative of a sharp increase in an amplitude of the sound and a sharp decrease in a spectral centroid of the sound, wherein the processor detects a gunshot by computation of a vector of change from the audio data, the vector of change including outputs of a direction and a magnitude that reflect a quick rise and fall time of the sound indicative as to a presence of the gunshot, wherein each audio sensing device of the plurality of audio sensing devices is further operable to transform the audio data into a plurality of frequency domain frames, wherein each frequency domain frame of the plurality of frequency domain frames is associated with a unique time interval of the audio data, and wherein each audio sensing device of the plurality of audio sensing devices is further operable to:

determine a first amplitude of a first frequency domain frame of the plurality of frequency domain frames;

determine a second amplitude of a second frequency domain frame of the plurality of frequency domain frames; and generate an amplitude difference vector between the first amplitude and the second amplitude.

10. The system of claim 9, wherein each audio sensing device of the plurality of audio sensing devices is further operable to:

transmit a unique device identifier to if the audio data is indicative of a sharp increase in amplitude of the sound and a sharp decrease in spectral centroid of the sound.

11. The system of claim 9, wherein each audio sensing device of the plurality of audio sensing devices is further operable to:

compare the amplitude difference vector with a threshold to determine if the amplitude difference vector is indicative of a sharp increase in an amplitude of the sound.

12. The system of claim 9, wherein each audio sensing device of the plurality of audio sensing devices is further operable to:

determine a first spectral centroid of a first frequency domain frame of the plurality of frequency domain frames;

determine a second spectral centroid of a second frequency domain frame of the plurality of frequency domain frames; and generate a spectral centroid difference vector between the first spectral centroid and the second spectral centroid.

13. The system of claim 12, wherein each audio sensing device of the plurality of audio sensing devices is further operable to:

compare the spectral centroid difference vector with a threshold to determine if the spectral centroid difference vector is indicative of a sharp decrease in a spectral centroid of the sound.

14. The system of claim 9, wherein the audio data defines a graph including at least one line associated with the sound and extending from frame to frame of the graph, a length of the at least one line defining the magnitude of change.

15. The system of claim 9, wherein the audio data defines a graph including at least one line associated with the sound, the direction reflected by an angle of the at least one line from a previous frame to a current frame in reference to a horizontal line of the graph equal to the previous frame.

* * * * *